(12) United States Patent
Sherman et al.

(10) Patent No.: US 12,146,207 B2
(45) Date of Patent: Nov. 19, 2024

(54) DEGRADABLE AND/OR DEFORMABLE DIVERTERS AND SEALS

(71) Applicant: Terves, LLC, Euclid, OH (US)

(72) Inventors: Andrew Sherman, Mentor, OH (US); Nicholas Farkas, Euclid, OH (US); Raghu Meesala, Euclid, OH (US)

(73) Assignee: Terves, LLC, Euclid, OH (US)

( * ) Notice: Subject to any disclaimer, the term of this patent is extended or adjusted under 35 U.S.C. 154(b) by 0 days.

(21) Appl. No.: 17/871,526

(22) Filed: Jul. 22, 2022

(65) Prior Publication Data
US 2022/0388058 A1    Dec. 8, 2022

Related U.S. Application Data

(60) Continuation of application No. 17/159,304, filed on Jan. 27, 2021, now abandoned, which is a
(Continued)

(51) Int. Cl.
| | |
|---|---|
| *B22D 21/04* | (2006.01) |
| *B22D 19/14* | (2006.01) |
| *B22D 21/00* | (2006.01) |
| *B22D 23/06* | (2006.01) |
| *B22D 25/06* | (2006.01) |
| *B22D 27/00* | (2006.01) |
| *B22D 27/02* | (2006.01) |
| *B22D 27/08* | (2006.01) |
| *B22D 27/11* | (2006.01) |
| *B22F 1/062* | (2022.01) |
| *C22C 1/03* | (2006.01) |
| *C22C 23/00* | (2006.01) |
| *C22C 23/02* | (2006.01) |
| *C22C 47/08* | (2006.01) |
| *C22C 49/04* | (2006.01) |

(Continued)

(52) U.S. Cl.
CPC .............. *C22C 23/00* (2013.01); *B22D 19/14* (2013.01); *B22D 21/007* (2013.01); *B22D 21/04* (2013.01); *B22D 23/06* (2013.01); *B22D 25/06* (2013.01); *B22D 27/00* (2013.01); *B22D 27/02* (2013.01); *B22D 27/08* (2013.01); *B22D 27/11* (2013.01); *B22F 1/062* (2022.01); *C22C 1/03* (2013.01); *C22C 23/02* (2013.01); *C22C 47/08* (2013.01); *C22C 49/04* (2013.01); *C22C 49/14* (2013.01); *B22F 2301/35* (2013.01); *B22F 2304/05* (2013.01); *B22F 2999/00* (2013.01); *C22C 49/02* (2013.01)

(58) Field of Classification Search
None
See application file for complete search history.

(56) References Cited

U.S. PATENT DOCUMENTS

| | | | | |
|---|---|---|---|---|
| 2013/0292123 | A1* | 11/2013 | Murphree | E21B 33/138 166/308.1 |
| 2016/0281454 | A1* | 9/2016 | Zhu | E21B 33/134 |

(Continued)

*Primary Examiner* — Charles R Nold
(74) *Attorney, Agent, or Firm* — UB Greensfelder LLP; Brian E. Turung

(57) ABSTRACT

A variable stiffness engineered degradable ball or seal having a degradable phase and a stiffener material. The variable stiffness engineered degradable ball or seal can optionally be in the form of a degradable diverter ball or sealing element which can be made neutrally buoyant.

16 Claims, 11 Drawing Sheets

Various Flap Designs

Related U.S. Application Data continuation-in-part of application No. 16/895,425, filed on Jun. 8, 2020, now Pat. No. 12,018,356, and a continuation-in-part of application No. 16/674,377, filed on Nov. 5, 2019, now abandoned, and a continuation-in-part of application No. 16/654,099, filed on Oct. 16, 2019, now Pat. No. 11,814,923, and a continuation-in-part of application No. 16/504,621, filed on Jul. 8, 2019, now Pat. No. 11,685,983, and a continuation-in-part of application No. 16/392,139, filed on Apr. 23, 2019, now Pat. No. 11,685,971, said application No. 16/674,377 is a continuation of application No. 16/365,003, filed on Mar. 26, 2019, now Pat. No. 10,544,304, said application No. 16/895,425 is a continuation of application No. 16/158,915, filed on Oct. 12, 2018, now Pat. No. 10,689,740, said application No. 17/159,304 is a continuation-in-part of application No. 16/149,637, filed on Oct. 2, 2018, now Pat. No. 11,167,343, and a continuation-in-part of application No. 16/045,924, filed on Jul. 26, 2018, now Pat. No. 10,865,465, and a continuation-in-part of application No. 15/728,813, filed on Oct. 10, 2017, now abandoned, said application No. 16/158,915 is a continuation-in-part of application No. 15/641,439, filed on Jul. 5, 2017, now Pat. No. 10,329,653, said application No. 16/504,621 is a division of application No. 15/601,451, filed on May 22, 2017, now abandoned, said application No. 16/365,003 is a continuation of application No. 15/592,325, filed on May 11, 2017, now Pat. No. 10,308,807, said application No. 15/728,813 is a division of application No. 15/294,957, filed on Oct. 17, 2016, now Pat. No. 10,625,336, said application No. 17/159,304 is a continuation of application No. 14/936,873, filed on Nov. 10, 2015, now Pat. No. 11,352,553, said application No. 15/641,439 is a division of application No. 14/689,295, filed on Apr. 17, 2015, now Pat. No. 9,903,010, said application No. 15/294,957 is a division of application No. 14/627,236, filed on Feb. 20, 2015, now Pat. No. 9,757,796.

(60) Provisional application No. 62/967,864, filed on Jan. 30, 2020, provisional application No. 62/747,358, filed on Oct. 18, 2018, provisional application No. 62/669,546, filed on May 10, 2018, provisional application No. 62/569,004, filed on Oct. 6, 2017, provisional application No. 62/537,707, filed on Jul. 27, 2017, provisional application No. 62/344,127, filed on Jun. 1, 2016, provisional application No. 62/340,074, filed on May 23, 2016, provisional application No. 62/081,216, filed on Nov. 18, 2014, provisional application No. 61/981,425, filed on Apr. 18, 2014, provisional application No. 61/942,879, filed on Feb. 21, 2014.

(51) Int. Cl.
*C22C 49/14* (2006.01)
*C22C 49/02* (2006.01)

(56) References Cited

U.S. PATENT DOCUMENTS

2016/0290083 A1* 10/2016 Takahashi .......... C08G 18/4283
2016/0290091 A1* 10/2016 Takahashi ............... E21B 33/12

* cited by examiner

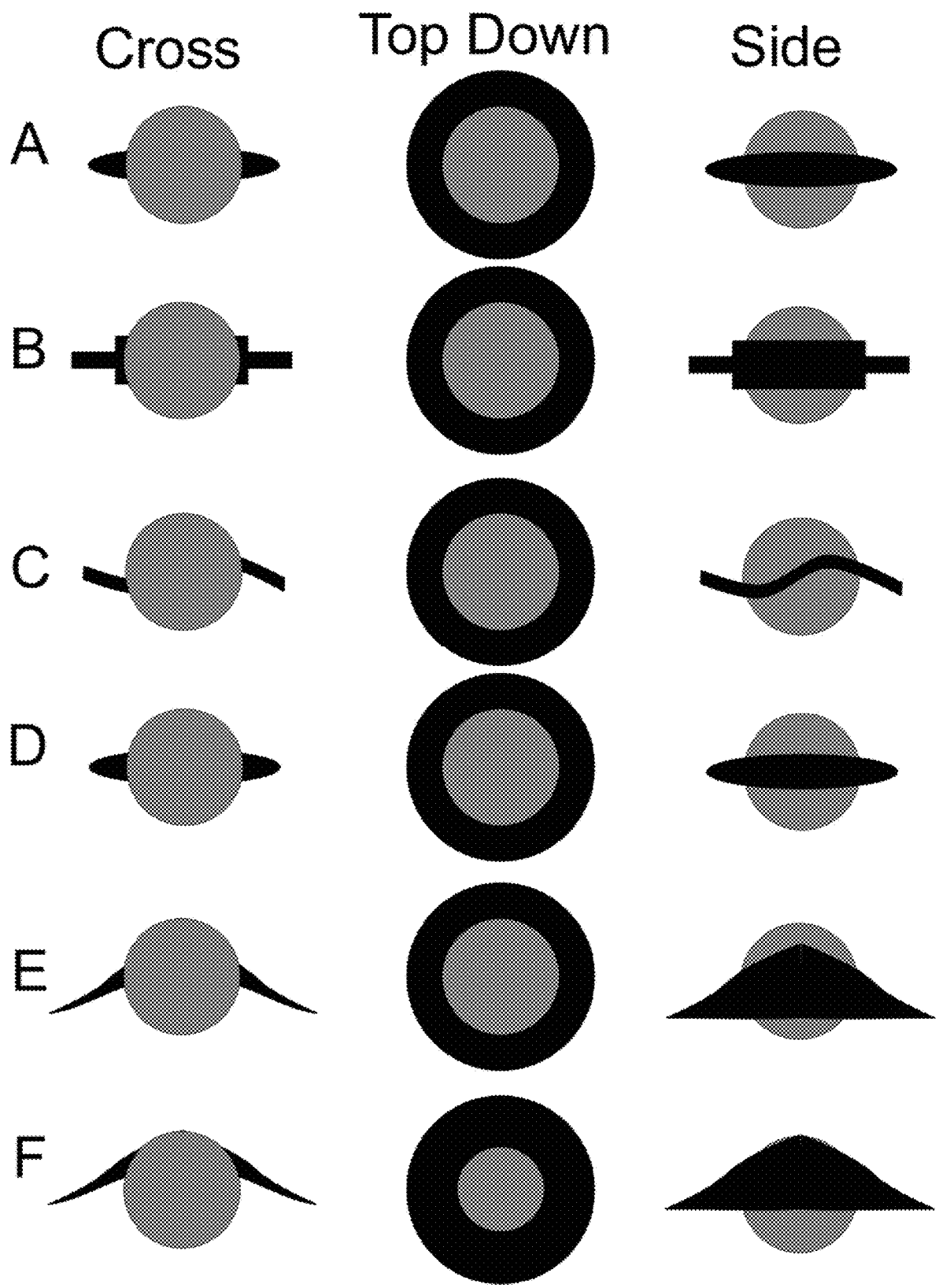
FIG. 10 – Various Flap Designs

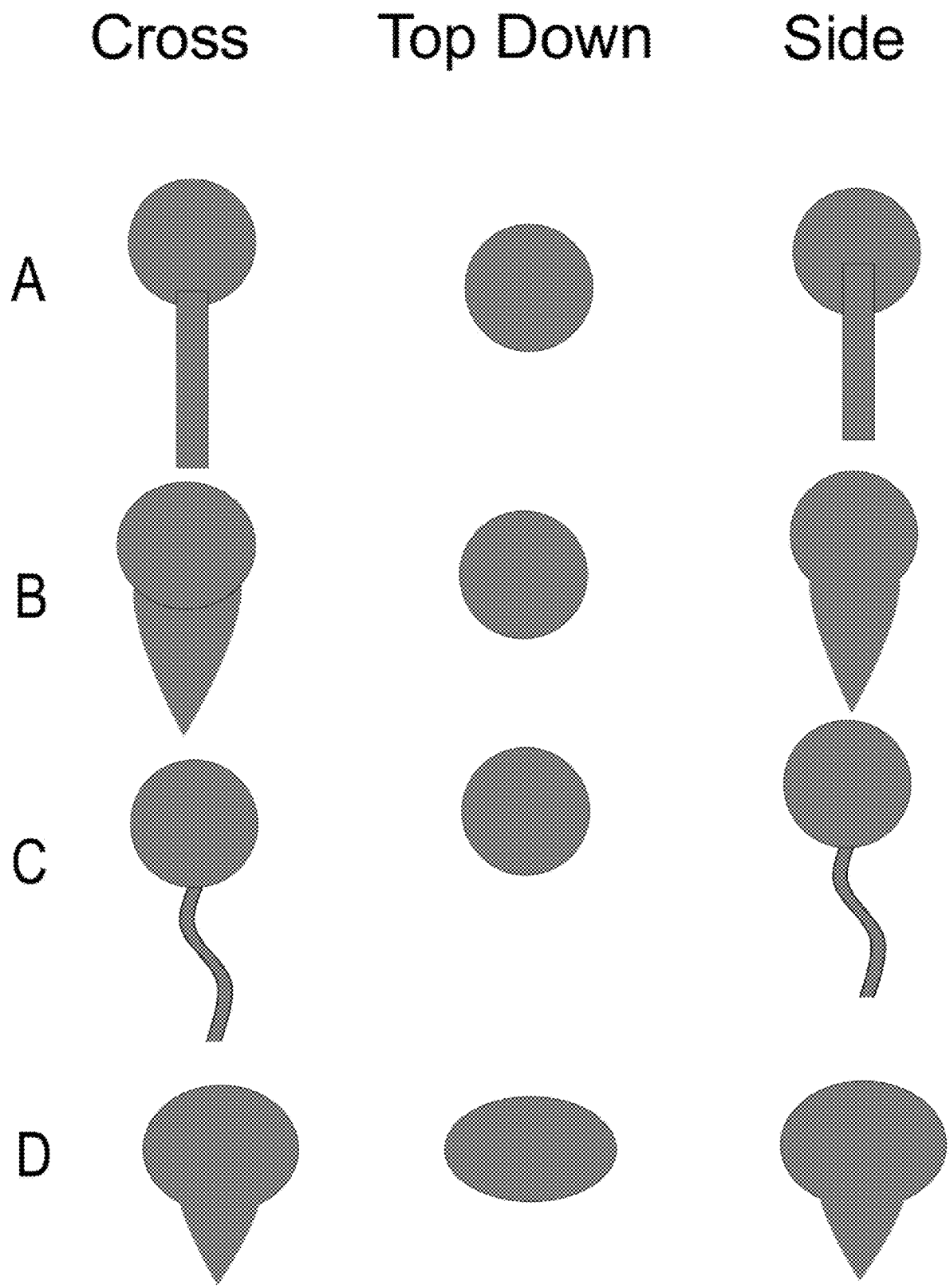
FIG. 11 – Tail Designs

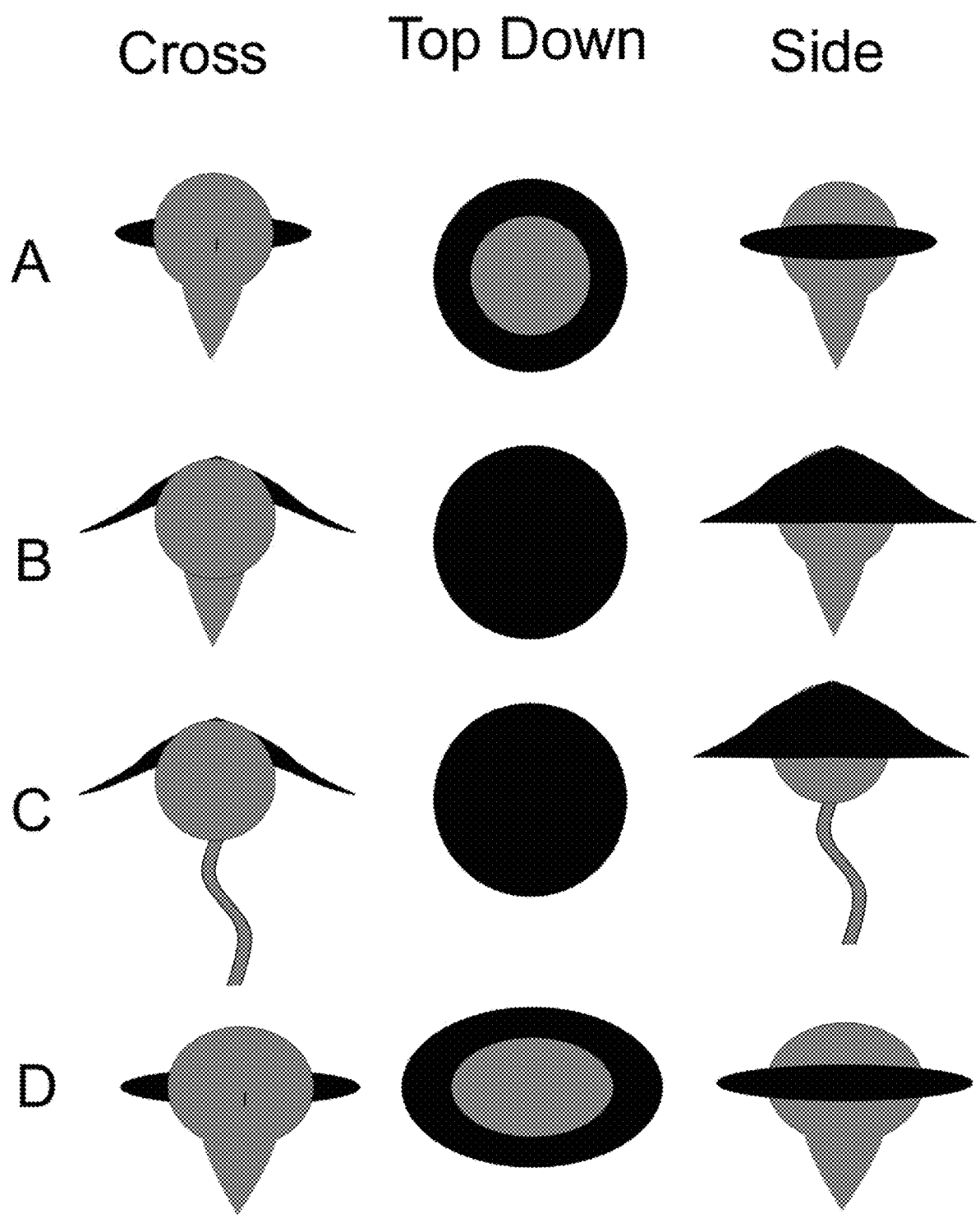
FIG. 12 – Various Composite Configurations

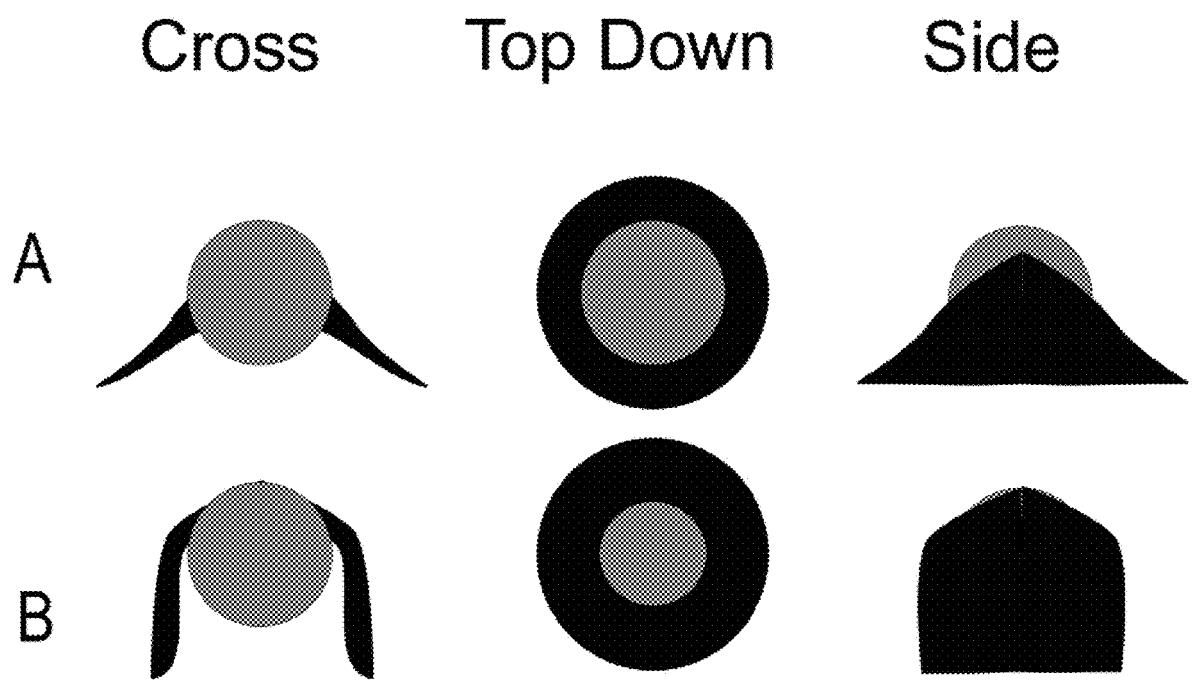
FIG. 13 – Flap As An Alignment Configuration

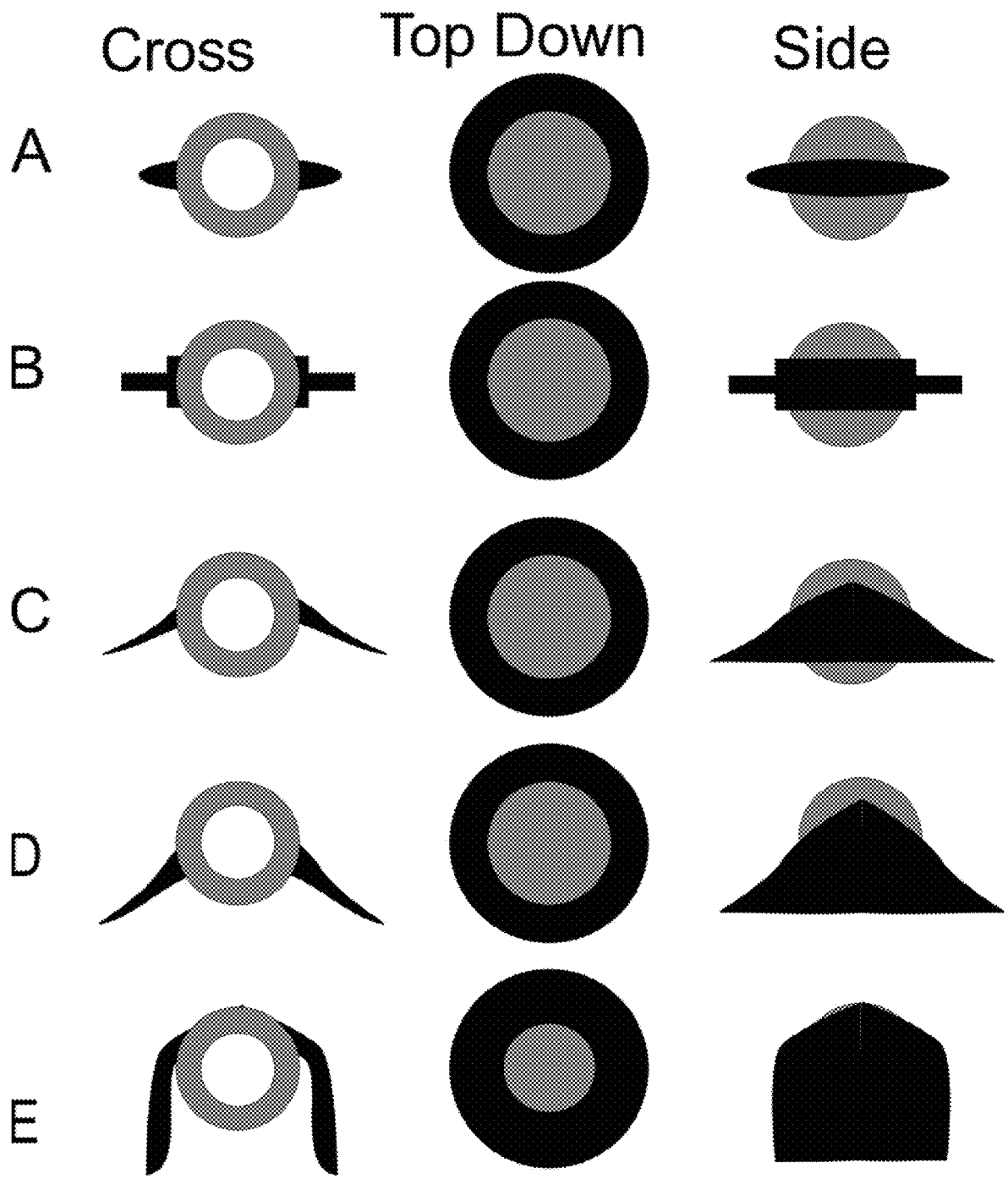
FIG. 14 - Hollow Balls with Overmolding

DEGRADABLE AND/OR DEFORMABLE DIVERTERS AND SEALS

The present disclosure is a continuation of U.S. patent application Ser. No. 17/159,304 filed Jan. 27, 2021, which in turn claims priority on U.S. Provisional Application No. 62/967,864 filed Jan. 30, 2020, which are all incorporated herein by reference.

The present disclosure is a continuation of U.S. patent application Ser. No. 17/159,304 filed Jan. 27, 2021, which in turn claims priority on U.S. patent application Ser. No. 16/654,099 filed Oct. 16, 2019, which in turn claims priority on U.S. Provisional Application No. 62/747,358 filed Oct. 18, 2018, which are all incorporated herein by reference.

The present disclosure a continuation of U.S. patent application Ser. No. 17/159,304 filed Jan. 27, 2021, which in turn claims priority on U.S. patent application Ser. No. 15/728,813 filed Oct. 10, 2017, which in turn is a divisional of U.S. patent application Ser. No. 15/294,957 filed Oct. 17, 2016 (now U.S. Pat. No. 10,625,336 issued Apr. 21, 2020), which is a divisional of U.S. patent application Ser. No. 14/627,236 filed Feb. 20, 2015, (now U.S. Pat. No. 9,757,796 issued Sep. 17, 2018), which in turn claims priority on U.S. Provisional Application No. 61/942,879 filed Feb. 21, 2014, which are all incorporated herein by reference.

The present disclosure a continuation of U.S. patent application Ser. No. 17/159,304 filed Jan. 27, 2021, which in turn claims priority on U.S. patent application Ser. No. 16/895,425 filed Jun. 8, 2020, which in turn claims priority on U.S. patent application Ser. No. 16/158,915 filed Oct. 12, 2018 (now U.S. Pat. No. 10,689,740 issued Jun. 23, 2020), which in turn is a continuation-in-part of U.S. patent application Ser. No. 15/641,439 filed Jul. 5, 2017 (now U.S. Pat. No. 10,329,653 issued Jun. 25, 2019), which in turn is a divisional of U.S. patent application Ser. No. 14/689,295 filed Apr. 17, 2015 (now U.S. Pat. No. 9,903,010 issued Feb. 27, 2018), which in turn claims priority on U.S. Provisional Application No. 61/981,425 filed Apr. 18, 2014, which are all incorporated herein by reference.

The present disclosure a continuation of U.S. patent application Ser. No. 17/159,304 filed Jan. 27, 2021, which in turn claims priority on U.S. patent application Ser. No. 16/504,621 filed Jul. 8, 2019, which in turn is a divisional application of U.S. patent application Ser. No. 15/601,451 filed May 22, 2017, which in turn claims priority on U.S. Provisional Application No. 62/340,074 filed May 23, 2016, which are all incorporated herein by reference.

The present disclosure a continuation of U.S. patent application Ser. No. 17/159,304 filed Jan. 27, 2021, which in turn claims priority on U.S. patent application Ser. No. 16/674,377 filed on Nov. 5, 2019, which in turn is a continuation of U.S. patent application Ser. No. 16/365,003 filed Mar. 26, 2019 (now U.S. Pat. No. 10,554,302 issued Jan. 28, 2020), which in turn is a continuation of U.S. patent application Ser. No. 15/592,325 filed May 11, 2017 (now U.S. Pat. No. 10,308,807 issued on Jun. 4, 2019), which in turn claims priority on U.S. Provisional Application No. 62/344,127 filed Jun. 1, 2016, which are all incorporated herein by reference.

The present disclosure a continuation of U.S. patent application Ser. No. 17/159,304 filed Jan. 27, 2021, which in turn claim priority on U.S. patent application Ser. No. 16/045,924 filed Jul. 26, 2018, which in turn claims priority on U.S. Provisional Application No. 62/537,707 filed Jul. 27, 2017, which are all incorporated herein by reference.

The present disclosure a continuation of U.S. patent application Ser. No. 17/159,304 filed Jan. 27, 2021, which in turn claims priority on U.S. patent application Ser. No. 16/149,637 filed Oct. 2, 2018, which in turn claims priority on U.S. Provisional Application No. 62/569,004 filed Oct. 6, 2017, which are all incorporated herein by reference.

The present disclosure a continuation of U.S. patent application Ser. No. 17/159,304 filed Jan. 27, 2021, which in turn claims priority on U.S. patent application Ser. No. 16/392,139 filed Apr. 23, 2019, which in turn claims priority on U.S. Provisional Application No. 62/669,546 filed May 10, 2018, which are all incorporated herein by reference.

The present disclosure a continuation of U.S. patent application Ser. No. 17/159,304 filed Jan. 27, 2021, which in turn claims priority on U.S. patent application Ser. No. 14/936,873 filed Nov. 10, 2015, which in turn claims priority on U.S. Provisional Application No. 62/081,216 filed Nov. 18, 2014, which are incorporated herein.

The disclosure is directed to a sealing arrangement that can include an engineered degradable thermoplastic elastomer, a degradable metallic device (e.g., degradable metallic ball, etc.), or sealing system having a controlled deformable soft system or a metal matrix system. The deformable engineered degradable thermoplastic elastomer or degradable metallic device or sealing system can optionally be in the form of a degradable diverter ball or other pumpable sealing system which changes stiffness or strength after deforming to form a seal, and which can optionally be made neutrally buoyant. The engineered controlled degradable sealant system is formulated to degrade in a completion fluid, including brine, guar gel, freshwater, produced water, etc., as a function of temperature or time, or accelerated or initiated under the action of a gelbreaker or other activator or controlled fluid. One non-limiting activator can be a change in pH, change in salinity, and/or a change in the oxidation/reductive nature of the completion fluid.

The disclosure is also directed to a metallic ball or seal having a controlled metal matrix reinforced with a matrix material and a method for manufacture thereof. The degradable metallic ball or seal can optionally be in the form of a degradable diverter ball or sealing element.

BACKGROUND OF THE DISCLOSURE

Oil and gas hydraulic stimulation and intervention operations commonly seek to temporarily isolate or block areas of a well. Degradable materials, as well as neutrally-buoyant materials, are highly useful in that they can be removed by degradation and/or flowback without the need for coiled tubing or other intervention tool, thereby saving time, water use, and cost in oil and gas completions. Flowable degradable sealing elements, including diverter balls, deformable pills, deformable flake-polymer mixtures, and other pumpable systems can be used for loss control during drilling operations, or temporarily sealing an opening (e.g., fracture or perforation) during a fracturing event.

One application that uses degradable materials is diverter balls. The diverter balls are used in fracturing operations for sealing individual openings or entire perforation zones to redirect flow and create a more uniform stimulated zone, or to perform loss control operations during drilling to prevent the loss of expensive mud and lubricants. These diverter balls can also be used in re-fracturing to improve capacity of the well, thereby eliminating the use of frac plugs and enabling temporary sealing of corroded or otherwise degraded surfaces (i.e., surfaces which may need extensive cleaning and are, as a result, difficult to seal). These diverter balls can act as temporary blocking agents to stop flow through existing fractures, such as during a hydraulic stimulation event to redirect flow to stimulate smaller channels or perforations, or to limit fluid losses during drilling in highly fractured formations where permanent sealing is not desired (e.g., in a pay zone, such as an open hole gas or geothermal well). The diverter balls are formulated to dissolve or degrade over time and, thus, generally do not require an additional step of retrieving the diverter balls from the wellbore. The diverter ball is generally used to temporarily prevent flow of the fluid into a location where the diverter ball seals the location and thereby causes the fluid to flow to a different location.

Pumpable seals are desired for frac plugs and other applications for use in drilling and hydraulic stimulation operations. Such seals should be able to be pumped and flow into openings (e.g., fractures or perforations) but need to build up or seal the opening by forming a rigid or otherwise high strength (less deformable) mass that resists flow. This seal must be able to deform to the opening (e.g., wellbore, perforation, fracture, slot, channel, or other subsurface or subsea opening) geometry, either by building up a network or by deformation to conform. The seal must either be able to bridge the fracture by agglomeration, such as that formed by flakes, long fibers, or other additives that can span all or a significant portion of the opening width, or by physically deforming (e.g., by partial crushing, or by plastic or elastic deformation) to conform and "seat" to the opening. After seating or bridging, the pumpable seal material must become rigid, resisting further deformation to form a seal. Furthermore, the seal should be degradable under controlled fluid exposure. Fluid exposure leading to degradation and removal can be in the form of the completion fluid (e.g., fracturing fluid), formation or flowback fluid, a gelbreaker, or other type of removal fluid. In the simplest sense, the deformable pumpable sealing element (ball or pumpable device) is removed by time and temperature of the fluid already in the wellbore (either drilling mud, flowback, or completion fluid). Temperature may increase with time, leading to removal after a specific period of time or, alternatively, various coatings or inhibitors may also be used to control/delay the removal time (e.g., U.S. Pub. No. 2018/0362415). Alternatively, the degradable pumpable sealing element or material can have extended life in the wellbore environment or initial fluid (e.g., not dissolvable in freshwater, not dissolvable in an oil-based drilling mud, or not dissolvable in a mud or brine with a corrosion inhibitor present), and then be removed through a fluid change introduced (e.g., by flowing back the well, by cleaning the mud from the well with a saline or controlled pH fluid, by changing pH or the nature of the fluid, such as through acid addition or the use of a gel-breaker) to facilitate the clean-up degradation and removal of the sealing material or ball.

For fluid loss control and diversion in fracturing operations, degradable materials have been used. As discussed in U.S. Pub. No. 2008/0093073, degradable materials have been used in different shapes and sizes to either build plugs or filter cakes. Degradable material assisted diversion (DMAD) is described as a method for multilayer-fracturing well treatment and enables diversion in a well. Such well operations are performed without any damage to the existing fracture or interference from the existing fracture. The degradable material discussed in U.S. Pub. No. 2008/0093073 can be comprised of a group of materials which are polymers or copolymers of lactide and glycolide, polyethyleneterephthalate (PET); polybutyleneterephthalate (PBT); polyethylenenaphthalenate (PEN); partially hydrolyzed polyvinyl acetate; and derivatives thereof, combinations and mixtures thereof, and the like. The degradable material can be also be present in the form of a slurry. The degradation of the degradable material discussed in U.S. Pub. No. 2008/0093073 can be triggered with temperature and can dissolve with the help of a chemical reaction. Simulation has also been done to understand the limitation of the induced stress diversion which would be in the order of 3 Mpa to 10 Mpa. Degradable metals, including magnesium (a relatively soft, deformable metal until alloyed) are also in use (e.g., U.S. Pub. Nos. 2019/0048448; 2017/0028465; and 2017/0268088; and U.S. Pat. No. 10,329,653).

A more recent perforation ball discussed in U.S. Pub. No. 20170210976 (Okamoto et al.) is directed to a perforation ball where at least one portion of the formulation must be water soluble. The term 'water soluble' refers to a material which dissolves at a specified temperature or the use of by-products being soluble in water. The water-soluble material can include polyvinyl alcohol (PVOH), polyglycolic acid (PGA), polytrimethyleneterephthalate (PTT), can be polyamides, polylactic acid (PLA), polybutylene succinate (PBS), polybutylene adipate terephalate (PEAT), or polybutylene adipate succinate (PBAS), and also polyvinyl acetate (PVA). These balls can also include a filler which may include wood flour, seeds, polymeric particles, ungelatinized starch granules, cork, gelatins, wood flour, saw dust, milled polymeric materials, agar-based materials, and the like. The filler can also include inorganic fillers such as calcium carbonate, titanium dioxide, silica, talc, mica, sand, gravel, crushed rock, bauxite, granite, limestone, sandstone, glass beads, aerogels, xerogels, clay, alumina, kaolin, microspheres, hollow glass spheres, porous ceramic spheres, gypsum dihydrate, insoluble salts, magnesium carbonate, calcium hydroxide, calcium aluminate, magnesium carbonate, ceramic materials, pozzolanic materials, salts, zirconium compounds, xonotlite (a crystalline calcium silicate gel), lightweight expanded clays, perlite, vermiculite, hydrated or unhydrated hydraulic cement particles, pumice, zeolites, exfoliated rock, ores, minerals, and the like. These fillers can vary from polymeric materials to alloys, filling, pellets, flakes, and powders. These can also include fibers which can include naturally occurring organic fibers which include flax, abaca, sisal, ramie, hemp, and bagasse. The fillers can include anti-microbial agents such as zinc oxide, copper and copper compounds, silver and silver compounds, colloidal silver, silver nitrate, silver sulfate, silver chloride, silver complexes, metal-containing zeolites, surface-modified metal-containing zeolites, or combination thereof. The metal-containing zeolites can include a metal such as silver, copper, zinc, mercury, tin, lead, bismuth, cadmium, chromium, cobalt, nickel, zirconium, or a combination thereof or agents such as o-benzyl-phenol. 2-benzyl-4-chloro-phenol, 2,4,4-trichloro-2'-hydroxydiphenyl ether, 4,4'-dichloro-2-hydroxydiphenyl ether, 5-chloro-2-hydroxydiphenyl-methane, mono-chloro-o-benzyl-phenol. 2,2'-methylenbis-(4-chloro-phenol), 2,4,6-trichlorophenol, or a combination thereof.

In view of the current state of diverter balls and diversion agents, there is a need for a crushable, elastically- or plastically-deformable diverter ball or network forming pumpable sealing material system having the ability to conform to an opening (e.g., a wellbore, perforation, fracture, slot, hole, channel, and/or other subsurface or subsea opening) and then resist further deformation to form a seal, and which material is optionally degradable. The commercially available degradable perforation balls and diverter systems are not acceptable because of their limited temperature range which can result in the balls softening and transforming to a different shape, thereby resulting in the ball being unable to hold pressure, the formation of byproducts which effect formation permeability (e.g., cannot be removed completely), or contain organic or other functional byproducts. Also, the remainders of these prior perforation balls may be forced into the fluir path and may not degrade completely, thereby causing problems in proper fluid flow in the well or other later well operations.

SUMMARY OF THE DISCLOSURE

The present disclosure is directed to degradable materials such as a degradable thermoplastic elastomer, a degradable metallic composite ball or metal-containing or metal-based pumpable seal having a controlled crush strength or a controlled plastically-deformable matrix. The thermoplastic elastomer, degradable metallic composite ball or metal-containing or metal-based pumpable seal can optionally include high aspect metallic flakes, wires, or foil that can deform, form a network, and/or create a seal of an opening (e.g., a fracture, wellbore, perforation, slot, hole, channel, other subsurface or subsea opening, and/or seat of a diverter or valve).

In another and/or alternative non-limiting aspect of the present disclosure, there is provided a degradable ball or seal such as a degradable ball (e.g., degradable diverter ball, etc.). The degradable ball generally has a diameter of at least about 0.1 in. (e.g., 0.1-6 in. and all values and ranges therebetween), generally more than 0.25 in., and the diameter can be 5 in. or more. In one non-limiting embodiment, the diverter ball has a diameter of ¾-1 in. In another non-limiting embodiment, the fracture sealing ball (or shapes, such as cones, darts, barbells, or other shape) has a principal dimension of 0.1-1.5 in. (and all values and ranges therebetween) in principle dimension (diameter, length, or width). The density of the degradable ball is generally about 0.9-2 g/cc (and all values and ranges therebetween), typically about 1.03-1.3 g/cc, more typically about 1.05-1.2 g/cc, still more typically about 1.05-1.15 g/cc, even more typically about 1.05-1.1 g/cc. The degradable ball can optionally include 10-50 vol. % (and all values and ranges therebetween) voids, and/or pores. The voids can be at least partially formed by microballoons (e.g., glass, phenolic, carbon, and/or ceramic microballoons) to reduce buoyancy. Voids and/or pores can optionally be partially or fully filled with a low density, pressure-resistant material, such as a syntactic polymer, walnut husk, or other low density filled polymer.

In one non-limiting aspect of the disclosure, there is provided a degradable diverter ball or diversion agent fabricated from a degradable material that can be removed through the action of a fluid, and with which the addition of a clean-up fluid (e.g., gelbreaker, acid, certain pH, certain salinity, etc.) can be substantially (80+% removal) or completely removed, leaving little or no debris which can contaminate the formation or wellbore. The degradable diverter ball or diversion agent can optionally be made neutrally buoyant in water, sand-water, brine, or sand-brine solutions with densities of 1.01-1.5 g/cc (and all values and ranges between), and typically 1.03-1.25 g/cc. In one non-limiting embodiment, the neutral buoyancy can be created through the addition or attachment of hollow microballoons such as, but not limited to, glass, carbon, polymer, walnut shell, or other buoyancy agent. The inclusion of microballoons and/or other buoyancy agent can be used to form one or more voids or pores in the degradable diverter ball or diversion agent (e.g. adding pores and/or voids to the inside or outside of the degradable diverter ball or diversion agent (e.g., flake, wire, foil, ribbon, or other shape)) and/or through the fabrication of a hollow core in the degradable diverter ball or diversion agent (e.g., via macropore addition, etc.). The hollow core and/or pores and/or voids can be empty or filled with a low density material such as, but not limited to, a gas, a syntactic or foamed polyethylene, polyurethane, phenolic, or epoxy filler. In another non-limiting embodiment, the neutral buoyancy can be created by use of a low density coating on the degradable diverter ball or diversion agent (e.g., flake, wire, foil, ribbon, or other shape). The hollow microballoons such as, but not limited to, cenospheres, phenolic, carbon, or glass microballoons, can optionally be used in or as a constituent in the material of the engineered degradable material. The microballoons and/or formed air pockets (when used) can create voids in the degradable composite to create a near-neutral buoyancy in the ball or seal. As can be appreciated, the neutral buoyancy can be created by use of both a low density coating on the degradable diverter ball or diversion agent and the use of one or more voids or pores in the degradable diverter ball or diversion agent.

In another and/or alternative non-limiting aspect of the present disclosure, there is provided a plastically deformable or partially crushable degradable ball or seal which is useful for the production of diverter balls and other sealing elements as well as methods of manufacture and methods for use in temporarily sealing well bore applications. The plastically deformable or partially crushable degradable ball or seal can be formed of: A) a metal degradable material (e.g., magnesium, magnesium alloy, aluminum, aluminum alloy, zinc, zinc alloy, and/or the degradable metals disclosed in U.S. Pub. Nos. 2019/0048448; 2017/0028465; and 2017/0268088; and U.S. Pat. No. 10,329,653, which are all incorporated herein by reference) including one or more voids and/or pores that can optionally be formed by microballoons (e.g., glass, phenolic, carbon, and/or ceramic microballoons), drilled out cavities, molded/cast cavities/pores, stamped cavities/pores, chemically-formed cavities/pores, and/or etched cavities/pores; B) a metal degradable material as in A) including an elastomeric, a rubber, or a polymer coating and/or structure (e.g., disc, ring, flap, etc.) wherein the elastomeric, rubber, or polymer material is optionally deformable, and wherein the elastomeric, rubber, or polymer material is optionally degradable (and if degradable, the elastomeric, rubber, or polymer material can optionally be formed of a material disclosed in U.S. Pub. Nos. 20170210976 and 2019/0048448, and U.S. Pat. Nos. 10,308,807; 9,757,796 and 9,903,010, which are all incorporated herein by reference; C) a metal degradable material as in A) that includes an elastomeric, rubber, or polymer coating and/or structure as in B) and one or more voids and/or pores as in A); D) a deformable elastomeric, rubber, or polymer material including one or more voids and/or fillers, and wherein the one or more voids can optionally be formed by microballoons (e.g., glass, phenolic, carbon, and/or ceramic microballoons), drilled out cavities, molded cavities/pores, chemically-formed cavities/pores, and/or etched cavities/pores, and wherein the filler can be a filler as described below; or E) a deformable elastomeric, rubber, or polymer material as in D) that includes a metal, an elastomeric, a rubber, or a polymer coating and/or structure (e.g., disc, ring, flap, etc.).

In another and/or alternative non-limiting aspect of the present disclosure, there is provided a plastically deformable or partially crushable degradable ball or seal which is useful for the production of diverter balls and other sealing elements which can be crushed and/or deformed at a lower stress, and then withstand a higher stress after deformation or partial crushing. In one non-limiting embodiment, the plastically deformable or partially crushable degradable ball or seal is formed of void- or microballoon-filled material. Such a material can be formulated and/or configured to deform at a relatively low crush strength, thereby resulting in the increase of its density. After initial crushing, the compressive strength of the material can be formulated and/or configured to increase dramatically (e.g., typically by at least 30%, and normally greater than 50%), potentially increasing to over 100% of the compressive strength of the initial material prior to the crushing of the voids and/or microballoons. Such increase in compressive strength of the material results in the material resisting further deformation after the initial crushing of the voids and/or microballoons within the material. The material can be formulated and/or configured to increase in strength through work-hardening (due to the result of deforming the material), and the change in strength is a 5-75% increase in strength, generally 10-35% increase in strength. By changing strength, the balls or other shaped device are able to deform to form a seal (deforming around a seat or irregularity), and then increase resistance to further deformation to thereby prevent further deformation of the deformed material after the seal has been formed.

In another and/or alternative non-limiting aspect of the present disclosure, the degradable material can optionally be formed from a mixture of degradable metallic material, such as magnesium alloy or specifically formulated water- or brine-dissolvable magnesium alloy (e.g., U.S. Pub. No. 2019/0048448; and U.S. Pat. No. 10,329,653 all of which are fully incorporated herein by reference) and a lower stiffness degradable component, such as degradable polymer or rubber, can be combined to form a pumpable pill or sealing system. The degradable metallic phase can be in the form of flakes, ribbons, turnings wires, or foil. Such material resists deformation after the degradable component has been partially or fully deformed. The lower stiffness degradable component (polymer or elastomer, high strain), and stiff (metallic) phases can optionally be laminated together, using the metallic phase as a "spring", such as via a chevron-type system, or the lower stiffness degradable component can be encapsulated in the metal, or the metal can be coated with the lower stiffness degradable component. When the materials are laminated together or when the lower stiffness degradable component can be encapsulated in the metal, the ball or seal can be designed to conform to an opening or fracture in a well formation to provide sealing to such opening or fracture. Alternatively, when metal is coated with the lower stiffness degradable component, the metal is configured to resist deformation, while the lower stiffness component (e.g., elastomeric or deformable polymeric material) in the form of a ball or seal controls sealing while enabling high pressure ratings. One non-limiting design of the ball or seal includes a hollow or syntactic degradable magnesium ball, coated with a degradable elastomeric or plastic material.

In another and/or alternative non-limiting aspect of the present disclosure, the variable stiffness engineered degradable thermoplastic elastomer ball or seal or degradable metallic composite ball or seal enables a temporary sealing element to be produced which can conform (e.g., deform) to an imperfect surface (non-smooth, non-uniform shaped surface, etc.) to create a seal against such surface, but which also can withstand a high pressure differential (high pressure on one side of formed seal and lower pressure on opposite side of formed seal) for an extended period of time (e.g., at least 30 minutes, typically at least 1-2 hours, and more typically at least 3-4 hours) without being pushed or extruded through the sealed opening (e.g., a fracture, wellbore, perforation, slot, hole, other subsurface or subsea opening, and/or seat of a diverter or valve), a channel [such as that between a frac plug mandrel, constraining ring, and casing], etc.). An opening is considered sealed or plugged if the flow through the opening is essentially stopped or decreased by 80-90% or more. The variable stiffness engineered degradable thermoplastic elastomer or deformable degradable metallic ball or seal in accordance with the present disclosure plugs openings have high flowthrough to thereby plug such high flowthrough perforation zones.

In another and/or alternative non-limiting aspect of the present disclosure, the variable stiffness engineered degradable thermoplastic elastomer or degradable variable stiffness metallic ball or seal can be formed to have a controlled rate of corrosion by controlling the surface area and/or particle size of the insoluble particles in the variable stiffness engineered degradable thermoplastic elastomer or degradable metallic composite ball or seal.

In another and/or alternative non-limiting aspect of the present disclosure, the hard phase (less or non-deformable phase) of the variable stiffness engineered degradable ball or seal can be a hard metal phase, hard ceramic phase, and/or high stiffness fiber having a stiffness or modulus of at least 5×, and typically greater than 10×, than the soft phase modulus of elasticity of the soft phase (e.g., elastomer, rubber, or poly phase) of the variable stiffness engineered degradable thermoplastic elastomer ball or seal.

In another and/or alternative non-limiting aspect of the present disclosure, the variable stiffness engineered degradable thermoplastic elastomer ball or seal or degradable metallic composite ball or seal can be a castable, moldable, or extrudable structure and can be assembled or structured using additive manufacturing, injection or compression molding, gluing, assembly, pressing, casting, forging, powder metallurgy, or other fabrication and forming techniques that combine the hard and soft or otherwise deformable phases of the variable stiffness engineered degradable thermoplastic elastomer or degradable ball or seal in the desired relationship and binds them together to enable load transfer from the soft to the hard phase, and/or to allow the hard phase to percolate (e.g., contact itself) during a compression or other deformation loading.

In another and/or alternative non-limiting aspect of the present disclosure, the hard phase of the variable stiffness engineered degradable thermoplastic elastomer ball or seal can be a degradable material, such as that described in U.S. Pub. Nos. 2017/0210976 and 2019/0048448; and U.S. Pat. Nos. 10,308,807; 9,757,796; and 9,903,010, which are incorporated herein by reference. The hard or stiff phase can be a metal material, ceramic material, and may also be a non-metal material such as PVA, PGA, PLA, soluble glass, glass fiber or flake, and can be in the form of a ball, fiber flake form or other form, and the hard or stiff phase can a degradable or non-degradable material.

In another and/or alternatively non-limiting aspect of the present disclosure, the hard and soft phases of the variable stiffness engineered degradable thermoplastic elastomer ball or seal can be arranged in a chevron-type sealing structure, hard/soft laminates, metal-encapsulated soft phase, or other physical arrangement to generate a high pressure rating and controlled degradation rate.

In another and/or alternative non-limiting aspect of the present disclosure, the variable stiffness engineered degradable thermoplastic elastomer ball or seal or degradable metallic composite ball or seal can include a ceramic hard phase, and such ceramic hard phase can optionally include microballoons. The microballoons can optionally be spheres. The microballoons (when used) can be generally less than 100 μm diameter (e.g., 1-99 μm and all values and ranges therebetween). The ceramic microballoons (when used) can be configured to include one or more hollow voids so as to be collapsible (e.g., crushable, breakable, etc.) and thereby result in the densification of the variable stiffness engineered degradable thermoplastic elastomer ball or seal or degradable metallic composite ball or seal, thereby resulting in the stiffening of the variable stiffness engineered degradable thermoplastic elastomer ball or seal or degradable metallic composite ball or seal.

In another and/or alternative non-limiting aspect of the present disclosure, the variable stiffness engineered degradable thermoplastic elastomer ball or seal or degradable metallic composite ball or seal can optionally include filler material to control the density of the variable stiffness engineered degradable thermoplastic elastomer ball or seal or degradable metallic composite ball or seal. The size and/or shape of the filler is non-limiting. In one non-limiting embodiment, the filler includes finer sized materials ranging from 5-450 mesh (including all sizes in-between). In another non-limiting embodiment, the filler can be ball shaped, tubular shaped, and/or other shapes and can have a size of 5-450 mesh or have larger sizes. U.S. Pub. No. 2010/0200235 (which is incorporated herein by reference) discloses non-limiting examples of materials which can used as filler such as, but not limited to, natural organic materials, inorganic minerals, silica materials and powders, ceramic materials, metallic materials and powders, synthetic organic materials and powders, mixtures, sodium chloride, sugar, silica flour calcium carbonate fillers, and/or fumed silica. The filler can optionally be formed of a degradable material. The filler material can also optionally include finely ground nut shells, walnut, Brazil nut, macadamia nut, as well as peach pits, apricot pits, or olive pits, and any resin-impregnated or resin-coated version of these. Silica materials and powders can also be used such as, but not limited to, glass spheres and glass microspheres, glass beads, glass fibers, silica quartz sand, sintered bauxite, silica flour, silica fibers, and sands of all types such as white or brown, silicate minerals, and combinations thereof. Typical silicate minerals suitable for use herein include the clay minerals of the kaolinite group (kaolinite, dickite, and nacrite), the montmorillonite or smectite group (including pyrophyllite, talc, vermiculite, sauconite, saponite, nontronite, and montmorillonite), and the illite (or clay-mica) group (including muscovite and illite), as well as combinations of such clay minerals. These fillers can include synthetic materials which include, but are not limited to, plastic particles, nylon pellets, nylon beads, powders, styrene divinyl benzene fibers, S-type filler fibers and yarns from American Kynol™, Inc., including carbon powders or carbon dust. Generally, the filling material (when used) constitutes 0.1-70 vol. % (and all values and ranges therebetween) of the variable stiffness engineered degradable thermoplastic elastomer ball or seal or degradable metallic composite ball or seal the variable stiffness engineered degradable thermoplastic elastomer ball or seal or degradable metallic composite ball or seal (and all values and ranges therebetween), and typically about 1-60 vol. % of the variable stiffness engineered degradable thermoplastic elastomer ball or seal or degradable metallic composite ball or seal, and more typically about 1-49.5 vol. % of the variable stiffness engineered degradable thermoplastic elastomer ball or seal or degradable metallic composite ball or seal.

In another and/or alternative non-limiting aspect of the present disclosure, when the variable stiffness engineered degradable thermoplastic elastomer ball or seal or degradable metallic composite ball or seal includes microballoons, the microballoons can be used for weight reduction in the variable stiffness engineered degradable thermoplastic elastomer ball or seal or degradable metallic composite ball or seal. Non-limiting microballoons that can be used are disclosed in U.S. Pat. No. 6,720,007 and U.S. Pub. No. 2003/0008932, which are incorporated herein by reference. The use of microballoons provides an overall reduction in the density of the degradable balls. Microballoons are generally thin-walled spherical shells ranging from ~20 μm to several millimeters in diameter. Generally, the volume percent loading of the microballoons is 10-70 vol. % (and all values and ranges therebetween) of variable stiffness engineered degradable thermoplastic elastomer ball or seal or degradable metallic composite ball or seal, typically 10-60 vol. % of variable stiffness engineered degradable thermoplastic elastomer ball or seal or degradable metallic composite ball or seal, and more typically 10-50 vol. % of the variable stiffness engineered degradable thermoplastic elastomer ball or seal or degradable metallic composite ball or seal. One non-limiting benefit of using microballoons is the reduction of the density of the variable stiffness engineered degradable thermoplastic elastomer ball or seal or degradable metallic composite ball or seal. Such reduction in the density of the variable stiffness engineered degradable thermoplastic elastomer ball or seal or degradable metallic composite ball or seal can result from the void space caused by the microballoons within the variable stiffness engineered degradable thermoplastic elastomer ball or seal or degradable metallic composite ball or seal. The ratio of the wall thickness (t) to microballoons radius (R) is an important factor in understanding the loading from the microballoons. The elastic/plastic response of microballoon-reinforced composites, as well as the plateau strength in compression (microballoon collapse) has been measured through finite element analysis of a unit cell model. The t/R and normalized wall thickness plays an important role in determining the elastic/plastic response. In the transient region, the strains will be larger with increasing t/R. For thin-walled microballoons, the fracture of the microballoons occurs at a low level of applied stress, which may limit the strength and ductility of the composite, but can also engineer local collapse and sealing/stiffness increase, particularly with metallic degradables such as magnesium degradable systems. In one non-limiting embodiment, the t/R is about 0.01-2 (and all values and ranges therebetween, and typically about 0.03-1.

In another and/or alternative non-limiting aspect of the present disclosure, the variable stiffness engineered degradable thermoplastic elastomer ball or seal or degradable metallic composite ball or seal can optionally include a hard ceramic phase, and such hard ceramic phase can optionally include soluble silicates. For example, soda ash and sand can be utilized for sodium silicate manufacture. The solubility of water glass occurs when the liquid media is an acid or alkaline solution. The solubility of these glasses varies at different pH. When the pH is 9-10.7, the solubility increases. When the pH is greater than 10.7, the solid phase of amorphous silica dissolves to form soluble silicate. At a higher pH, the amorphous solid cannot stay in equilibrium. The temperature also has an effect on solubility. As the temperature increases, solubility of water glass increases. The sodium silicates can be formed using $SiO_2$, $Al_2O_3$, $Fe_2O_3$, $MgO$, $CaO$, $Na_2O$, $K_2O$, $TiO_2$, $P_2O_5$, chromium, BA, PPb, sulfur, chlorine or any combination thereof. Magnesium and calcium oxides in water glass control the solubility of the compounds due to their high negative potential values.

In another and/or alternative non-limiting aspect of the present disclosure, the variable stiffness engineered degradable thermoplastic elastomer ball or seal can optionally include organic fillers such as, but not limited to, wood flour, seeds, polymeric particles, ungelatinized starch granules, cork, gelatins, wood flour, sawdust, milled polymeric materials, agar-based materials, and the like; and/or inorganic fillers such as, but not limited to, calcium carbonate, titanium dioxide, silica, talc, mica, sand, gravel, crushed rock, bauxite, granite, limestone, sandstone, glass beads, aerogels, xerogels, clay, alumina, kaolin, microspheres, hollow glass spheres, porous ceramic spheres, gypsum dihydrate, insoluble salts, magnesium carbonate, calcium hydroxide, calcium aluminate, magnesium carbonate, ceramic materials, pozzolanic materials, salts, zirconium compounds, xonotlite (a crystalline calcium silicate gel), lightweight expanded clays, perlite, vermiculite, hydrated or nonhydrated hydraulic cement particles, pumice, zeolites, exfoliated rock, ores, minerals, and the like. The fillers can include, but are not limited to, rye, oat, and/or triticale straw.

In another and/or alternative non-limiting aspect of the present disclosure, the variable stiffness engineered degradable thermoplastic elastomer ball or seal can optionally include organic fillers, wherein the use of the fillers improves properties such as static mechanical, damping, barrier properties, hardness, and cross-linking density. The addition of straw fillers increases torque as compared to the unfilled system. Delta M values and degree of cross-linking increase with the addition of straw. The addition of natural fillers reduces gas permeability.

In another and/or alternative non-limiting aspect of the present disclosure, the variable stiffness engineered degradable thermoplastic elastomer ball or seal can optionally include organic fillers, wherein the filler includes soluble silicates. Soluble silicates are very highly reactive with oil well cement where $Ca^{2+}$ ions react with $Na_2SiO_3$ (which is in the form of calcium chloride) to produce calcium-silica hydrate gel. These compounds are available as colorless transparent solids and are mainly soluble in water. These sodium silicates mix with sand and soda ash to dissolve in steam to produce water glass. PQ silicates have silicates in the ratio of $SiO_2:Na_2O$ ratio of 3.22 to 1.00. Silicates are utilized mostly as gels or for hydration. For polymerization, the ratio of $SiO_2:Na_2O$ plays a major role. The reaction with acids would be as follows:

$$xSiO_2 \cdot Na_2O + H_2SO_4 \rightarrow xSiO_2 + Na_2SO_4$$

When an aqueous solution is in contact with water glass such as silicate glass, a controlled diffusion of hydrogen-alkali ion exchange is undertaken. When the pH>9, the network starts to break down at the interface of the solution. The rate of dissolution in aqueous solution increase with increasing pH and the ion exchange rate decreases sharply. The decomposition is represented by the following:

(1)

-continued

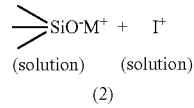

(2)

Where M denotes an alkali atom, I denotes a solvated monovalent cation.

In another and/or alternative non-limiting aspect of the present disclosure, the soft or deformable phase of the variable stiffness engineered degradable thermoplastic elastomer ball or seal can have a hardness of 50-100 Shore A (and all values and ranges therebetween). In one non-limiting embodiment, the soft phase can be formed of about 2-90 vol. % (and all values and ranges therebetween) of one or more elastomers, rubbers, and/or polymers, typically 10-80 vol. %, more typically 15-80 vol. %, and still more typically 20-70 vol. %. The stretched length or extension of the elastomers, rubbers, and/or polymers can have at least 20% elongation or compression. The elastomers, rubbers, and/or polymers can optionally include other components such as plasticizer and/or compatibilizer.

In another and/or alternative non-limiting aspect of the present disclosure, elastomers, rubbers, and/or polymers in the variable stiffness engineered degradable thermoplastic elastomer ball or seal contribute to about 5-90% (and all values and ranges therebetween) of the strain response (compressive or tensile deformation dominated by the soft component), typically about 5-50%, and more typically 10-30%, after which the hard phase dominates the strain response. This behavior is illustrated in FIG. 1, which illustrates the stress versus displacement for three different variable stiffness elastomer composites. As a load is applied to the variable stiffness engineered degradable thermoplastic elastomer ball or seal, significant deformation of the soft phase occurs in the variable stiffness engineered degradable thermoplastic elastomer ball or seal. After a certain point, the load in the variable stiffness engineered degradable thermoplastic elastomer ball or seal is transferred to the hard phase of the variable stiffness engineered degradable thermoplastic elastomer ball or seal, and the load increases at 5-100× (and all values and ranges therebetween) the slope of the soft phase. Deformations of the variable stiffness engineered degradable thermoplastic elastomer ball or seal of about 5-50% (and all values and ranges therebetween) are common before shifting from the low to high stiffness (slope).

In another and/or alternative non-limiting aspect of the present disclosure, the variable stiffness engineered degradable thermoplastic elastomer ball or seal can include various types of elastomers. One non-limiting elastomer that can be used is a thermoset vulcanized elastomer. Such thermoset vulcanized elastomers include, but are not limited to, all forms of silicone rubber, urethane rubber, natural rubber, nitrile rubber, and/or fluoropolymer rubbers. Nitrile rubbers (NBR) and hydrogenated nitrile rubbers, vinylidene fluoride CO and terpolymers (FKM), propylene-tetraflouroethylene (FEPM, AFLAS®), and perflouroelastomers (FFKM, Kalrez®, CHEMRAZ®) can be used with or without adhesive additions. The nitrile rubber can include NBR from Baymod, but this is not required. Nitrile or silicone rubber can also be mixed with acrylate-butadiene rubber (ABR) or styrene butadiene rubber (SBR), which is used as a filler and can be obtained from recycled tires. The NBR products can be differentiated with different acrylonitrile contents.

In another and/or alternative non-limiting aspect of the present disclosure, the variable stiffness engineered degradable thermoplastic elastomer ball or seal can include ethylene elastomers. Non-limiting ethylene-based copolymers include those described in U.S. Pat. No. 5,218,071 (which patent is incorporated herein by reference) such as alpha-olefins are propylene, I-butene, hexene-1 and octene-1. Generally, the alpha-olefin is propylene or I-butene may include, but is not limited to, EXACT™ from ExxonMobil, DOWLEX™, or ATTANE™. The elastomer in the variable stiffness engineered degradable thermoplastic elastomer ball or seal can be an olefinic elastomer such as, but not limited to, styrene-(ethylene-butylene), styrene-(ethylene-propylene), styrene-(ethylene-butylene)-styrene, styrene-(ethylene-propylene)-styrene, styrene-(ethylene-butylene)-styrene-(ethylene-butylene), styrene-(ethylene-propylene)-styrene-(ethylene-propylene), and styrene-ethylene-(ethylene-propylene)-styrene. Additional elastomers that can be used in the variable stiffness engineered degradable thermoplastic elastomer ball or seal are disclosed in U.S. Pat. Nos. 4,663,220; 4,323,534; 4,834,738; 5,093,422; and 5,304,599, all of which are incorporated herein by reference.

In another and/or alternative non-limiting aspect of the present disclosure, the variable stiffness engineered degradable thermoplastic elastomer ball or seal can include polymers such as Kraton™ from Kraton Polymers which include S-EP-S elastomeric copolymers, and polymers such as Septon™ from Kuraray. These polymers include, but are not limited to, tetrablock copolymer which can include styrene poly styrene poly block copolymer. Some polymers degrade by solvolysis in high temperature and pressure situations.

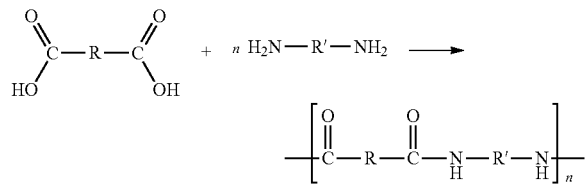

In another and/or alternative non-limiting aspect of the present disclosure, the variable stiffness engineered degradable thermoplastic elastomer ball or seal can include polymers such as, but not limited to, polyesters, polyamides, polycarbonates, or polyamides which can cause selected polymers to have minimized phase separation. These polymers include, but are not limited to, poly(vinyl alcohol) (PVA), polyethylene glycol (PEG), polyglycolide (PGA), poly(lactic acid) (PLA), polysaccharides, collagen, polyvinylpyrrolidone, hydroxyethyl acrylate or methacrylate, hydroxypropyl acrylate or methacrylate, acrylic or methacrylic acid, acrylic or methacrylic esters or vinyl pyridine, acrylamide, vinyl acetate, vinyl alcohol, and ethylene oxide. The polymers can also be a blend of materials which can be a mixture of biodegradable materials (like polylactic acid) and a material (like boric acid) which can be considered to affect degradation. The choice of these mixtures depends on different well bore conditions which can range from 60-250° F. (and all values and ranges therebetween).

In another and/or alternative non-limiting aspect of the present disclosure, the variable stiffness engineered degradable thermoplastic elastomer ball or seal can include one or more water-soluble or water-reactive polymers. The water-soluble polymers can range from 5-95 vol. % (and all values and ranges therebetween) of the variable stiffness engineered degradable thermoplastic elastomer ball or seal, and typically 20-78 vol. % of the variable stiffness engineered degradable thermoplastic elastomer ball or seal. To control the degradation rates in different downhole environments, certain thermoplastic elastomers such as, but not limited to, poly (vinyl acetate), poly (vinyl alcohol), and the like undergo irreversible degradation reactions; once degraded in the downhole, the polymers do not recrystallize or reconsolidate, but will degrade. In the thermoelastic phase, the thermoplastic elastomer can include, but is not limited to, polyethylene oxide, ethylene oxide-propylene oxide copolymers, polymethacrylic acid, polymethacrylic acid copolymers, polyvinyl alcohol, poly(2-ethyl oxazoline), polyvinyl methyl ether, polyvinyl pyrrolidone/vinyl acetate copolymers, methyl cellulose, ethyl cellulose, hydroxypropyl cellulose, hydroxypropyl methyl cellulose, ethyl hydroxyethyl cellulose, methyl ether starch, poly (n-isopropyl acrylamide), poly N-vinyl caprolactam, polyvinyl methyl oxazolidone, poly (2-isopropyl-2-oxazoline), and/or poly (2,4-dimethyl-6-triazinyl ethylene).

In another and/or alternative non-limiting aspect of the present disclosure, the variable stiffness engineered degradable thermoplastic elastomer ball or seal can include one or more polymers formulated to degrade when exposed to liquids that are typically used in fracking environments. The polymer can optionally be degradable by hydrolysis or solvates and has increased solubility at temperatures of 40-50° C. (and all values and ranges therebetween). In one non-limiting embodiment, the polymer degrades at least 10% at 55° C. or more. In another non-limiting embodiment, the polymer degrades at least 10% at 70° C. or more. In one non-limiting embodiment, the polymer degrades at least 10% at 100° C. or more. In one non-limiting embodiment, the polymer degrades at least 10% at 110° C. or more. In one non-limiting embodiment, the polymer degrades at least 10% at 135° C. or more. In one non-limiting embodiment, the polymer degrades at least 10% at 180° C. or more. U.S. Pat. No. 4,499,154 (which is incorporated herein by reference) discloses several polymers that can be used in the present disclosure, such as vinyl pyrrolidone, hydroxyethyl acrylate or meth-acrylate (e.g., 2-hydroxyethyl methacrylate), hydroxypropyl acrylate or methacrylate, acrylic or methacrylic acid, acrylic or methacrylic esters or vinyl pyridine, acrylamide, vinyl acetate, vinyl alcohol (hydrolyzed from vinyl acetate), ethylene oxide, polyvinylpyrrolidone derivatives thereof, and so forth. Vinyl alcohol copolymers can be obtained by hydrolysis of a copolymer of a vinyl ester with an olefin having 2-30 carbon atoms, such as, but not limited to: ethylene, propylene, I-butene, etc.; an unsaturated carboxylic acid having 3-30 carbon atoms such as, but not limited to, acrylic acid, methacrylic acid, crotonic acid, maleic acid, fumaric acid, etc., or an ester, salt, anhydride or amide thereof; an unsaturated nitrile having 3-30 carbon atoms such as, but not limited to, acrylonitrile, methacrylonitrile, etc.; a vinyl ether having 3-30 carbon atoms such as, but not limited to, methyl vinyl ether, ethyl vinyl ether, etc.; and so forth.

In another and/or alternative non-limiting aspect of the present disclosure, the variable stiffness engineered degradable thermoplastic elastomer ball or seal can include plasticizer, compatibilizer, binder, polyester, filler, adhesion additions, reactive and/or swellable additive. The content of the one or more optional components in the elastomer (when used) is about 1-80 vol. % (and all values and ranges therebetween), and typically 20-80 vol. %. One or more of the optional components can be dissolvable or degradable by hydrolysis.

In another and/or alternative non-limiting aspect of the present disclosure, the variable stiffness engineered degradable thermoplastic elastomer ball or seal can include: plasticizers, which plasticizer can be from the group of sugars (e.g., glucose, sucrose, fructose, raflinose, maltodex-trose, galactose, xylose, maltose, lactose, mannose, and erythrose), sugar alcohols (e.g., erythritol, xylitol, malitol, mannitol, and sorbitol), polyols (e.g., ethylene glycol, glycerol, propylene glycol, dipropylene glycol, butylene glycol, and hexane triol), manganese chloride tetrahydrate, magnesium chloride hexahydrate, etc.; anhydrides of sugar alcohols such as, but not limited to, sorbitan; animal proteins such as, but not limited to, gelatin; vegetable proteins such as, but not limited to, sunflower protein, soybean proteins, cotton seed proteins; and mixtures thereof. Other suitable plasticizers include phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, and/or other acid esters. Aliphatic acids can also be used such as, but not limited to, copolymers of ethylene and acrylic acid, polyethylene grafted with maleic acid, polybutadiene-co-acrylic acid, polybutadiene-co-maleic acid, polypropylene-coacrylic acid, polypropylene-comaleic acid, and/or other hydrocarbon-based acids. Several non-limiting examples of degradable polymers include polysaccharides such as dextran or cellulose; chitin; chitosan; proteins; aliphatic polyesters; poly (lactide); poly(glycolide); poly(e-caprolactone); poly(hydroxybutyrate); poly(anhydrides); aliphatic polycarbonates; poly(ortho esters); poly(amino acids); poly(ethylene oxide); and/or polyphosphaZenes. Polyanhydrides are another type of particularly suitable degradable polymer useful in the present disclosure. Non-limiting examples of suitable polyanhydrides include poly (adipic anhydride), poly (suberic anhydride), poly(sebacicanhydride), and poly (dodecanedioic anhydride). Other suitable examples include, but are not limited to, poly(maleicanhydride) and/or poly (benzoic anhydride). Other non-limiting examples of plasticizers include, but are not limited to, polyethylene glycol, Sorbitol, glycerin, soybean oil, castor oil, TWEEN™ 20, TWEEN™ 40, TWEEN™ 60, TWEEN™ 80, TWEEN™ 85, sorbitan monolaurate, sorbitan monooleate, sorbitan monopalmitate, sorbitan trioleate, sorbitan monostearate, PEG, derivatives of PEG, N,N-ethylene bis-stearamide, N,N-ethylene bisoleamide, polymeric plasticizers such as poly (1, 6-hexamethylene adipate), or combination thereof. U.S. Pub. No. 2017/0210976 (which is incorporated by reference herein) describes embodiments which include oligomers with styrene and acrylate building blocks having desirable glycidyl groups incorporated as side chains. The use of plasticizers softens the final variable stiffness engineered degradable thermoplastic elastomer ball or seal, thereby increasing its flexibility. The plasticizer increases compatibility of the melt blend components, which have improved processing characteristics during the blending, control, and regulation of the sensitivity and degradation of the polymer by moisture.

In another and/or alternative non-limiting aspect of the present disclosure, the variable stiffness engineered degradable thermoplastic elastomer ball or seal can include polyethylene oxide, ethylene oxide-propylene oxide copolymers, polymethacrylic acid, polymethacrylic acid copolymers, polyvinyl alcohol, poly(2-ethyl oxazo-line), polyvinyl methyl ether, polyvinyl pyrrolidone/vinyl acetate copolymers, methyl cellulose, ethyl cellulose, hydroxypropyl cellulose, hydroxypropyl methyl cellulose, ethyl hydroxyethyl cellulose, methyl ether starch, poly(n-isopropyl acrylamide), poly(n-vinyl caprolactam), poly(n-vinyl methyl oxazolidone), poly (2-isopropyl-2-oxazoline), and/or poly (2, 4-dimethyl-6-triazinyl ethylene).

In another and/or alternative non-limiting aspect of the present disclosure, the variable stiffness engineered degradable thermoplastic elastomer ball or seal can include carboxylic acid, fatty alcohol, fatty acid salt, fatty ester, fatty acid salt, or combination thereof. Suitable fatty alcohols and fatty esters may also be used in soft phase montanyl alcohol (having a melting point of 83° C./171° F.; tert-butylhydroquinone (having a melting point of 128° C./262° F. and insoluble in water); cholesterol (having a melting point of 149° C./300° F. and a solubility of 0.095 mg/L of water at 30° C./86° F.; cholesteryl nonanoate (having a melting point of about 80° C./176° F. and insoluble in water); benzoin (having a melting point of about 137° C./279° F. and slightly insoluble in water); borneol (having a melting point of about 208° C./406° F. and slightly insoluble in water); exo-norborneol (having a melting point of 125° C./257° F.; and glyceraldehyde triphenylmethanol (having a melting point of 164.2° C./324° F. and insoluble in water); propyl gallate (having a melting point of 150° C./302° F.; and dimethyl-terephthalate (DMT) (having a melting point of 141° C./286° F., and limited solubility in water which is more soluble than "slightly"). US Pub. No. 2010/0200235 (which is incorporated by reference herein) describes a group of alcohols and acids from the group including, but not limited to, prednisolone acetate (CHO, M.P. 233° C. (451° F.), slightly soluble in water), cellobiose tetraacetate (slightly soluble in water), terephthalic acid dimethyl ester, (CoHoO, M.P. 140° C. (284° F.), slightly soluble in water). Other examples of esters can be found in ester waxes such as carnauba wax and ouricouri wax. Carnauba wax contains ceryl palmitate, myricyl ceretate, myricyl alcohol (CoHOH), along with other high molecular weight esters and alcohols. Glycerol containing tris 12-hydroxy stearate (also known as opalwax) with a melting point of 172° F. can be used.

In another and/or alternative non-limiting aspect of the present disclosure, the variable stiffness engineered degradable thermoplastic elastomer ball or seal or degradable metallic composite ball or seal can be manufactured from a variety of manufacturing processes or equipment, such as sigma blending, v blending, injection mixer, or any solvent-based techniques as well. The molding process can include melting, molding, and hot press. The variable stiffness engineered degradable thermoplastic elastomer ball or seal can be developed in a conventional injection molding machine where a batch is mixed and the blend is transferred to a hopper of an injection molding machine which melts under heat. The molding temperatures can vary from 100-500° F. (and all values and ranges therebetween). The material can be injected or compression molded into a mold cavity to manufacture any size ball. Other manufacturing processes can include utilizing a degradable thermoplastic elastomer as a soft phase and a metal ball as a hard phase where the soft phase is thermally melted over the degradable metallic ball to manufacture the diverter ball.

In another and/or alternative non-limiting aspect of the present disclosure, the variable stiffness engineered degradable thermoplastic elastomer ball or seal or degradable metallic composite ball or seal can be formed from a coated particulate material suitable for use in subterranean operations. Non-limiting examples of particulate material that can be used in the present invention include ceramic materials, glass materials, metal materials, polymer beads, bauxite, sand, recycled bio-organic lignin or cellulose (like nut shells), and the like. The particle size of the particulate material is generally at least 0.005 mm and typically less than about 20 mm (0.005-20 mm and any value or range therebetween). Thermopolymers for use as a coating for the particulate material must meet certain criteria with regard to a combination of tensile strength, adhesive strength, and cross-linking density of thermopolymers. Thermoplastic polymers that can be used to partially or fully coat the particulate material are those that are capable of self-cross-linking functionality. These polymers include, but are not limited to, polyamines, polyvinyl acetals, polyvinyl butyrals, derivatives of a polyamine, and derivatives of polyvinyl acetal. Thermopolymer polyvinyl acetals are one non-limiting cross-linkable thermopolymer that can be used based on their high tensile strength relative to other thermopolymers, in addition to their relatively high cross-linking unit density per monomer unit molecular weight. However, other or additional polymers can be used. The polymer-coated particulate material of the present invention results in an immobile proppant with increased pack permeability, improved proppant pack stability that prevents encroachment of formation fines into the pack, migration of fines within the proppant pack, and sediment permeation.

In accordance with one non-limiting embodiment of the invention, there is provided a method for production of a polymer-coated proppant through a discreet polymer coating solution composition and application. The polymer coating on the particulate material constitutes at least a 2% increase in volume around the particulate material, and typically no more than a 50% volume increase (2-50% and all values and ranges therebetween). Additives and/or modifiers can optionally be added to the polymer coating to obtain improved properties over pure cross-linkable thermoplastic polymers (e.g., adhesion strength, etc.). These additives and modifiers control the mechanical properties and/or cure strength of the polymer coating. In one non-limiting embodiment, 0.5-50 wt. % (and all values and ranges therebetween) of the polymer coating includes one or more additives and/or modifiers. In another non-limiting embodiment, the polymer coating includes 0.5-30 wt. % (and all values and ranges therebetween) plasticizer. The plasticizer (when used) controls deformation under loads to improve interparticle contact area.

In another non-limiting embodiment, fillers and diluents can optionally be added to the polymer coating to provide higher tensile and/or tear strength for specific applications, and/or to improve high temperature stability for the low temperature curing system. Non-limiting fillers include, but are not limited to, thermoset resins and/or inorganic powders/fibers, nanoparticle fillers, and/or silane-coupled oxide nanoparticles and nanoplatelets. The fillers (when used) constitute 0-50 wt. % (and all values and ranges therebetween) of the polymer coating. In accordance with another non-limiting embodiment of the invention, the polymer coating optionally includes one or more chemical additives for special in situ properties/activities. Such chemical additives include, but are not limited, to antimicrobial metals, radiolabeled chemical tracers and/or kinetic expandable fillers. The polymer coating can optionally include one or more cross-linker compounds. Such cross-linker compounds include, but are not limited to, dialdehyde and trialdehydes. The cross-linker compounds allow for control over particle adhesion strength and/or chemical/water resistances. The cross-linker is generally added in an amount of 0.05-10 wt. % (and all values and ranges therebetween) of the coating mixture. In application, the well treating method using the thermoplastic-coated proppant includes (1) placement of the thermoplastic polymer-coated particles at the desired location in the well, and (2) initiation of self-annealing of the coated particles by deep-well conditions having closure pressures at low as about 1,000 psig, and temperatures as low as about 30° C. The thermoplastic polymer-coated particles have improved performance at temperatures of 40-130° C. (any value or range therebetween) and pressures of 2000-12000 psig (and any value or range therebetween). As can be appreciated, the thermoplastic polymer-coated particles of the present invention can be used at higher temperatures and/or pressures.

In another non-limiting aspect of the present invention, there is provided a method of treating a subterranean formation with a coated proppant comprising the steps of a) introducing a fluid suspension of free-flowing coated proppants to the subterranean formation; b) delivering/packing the coated proppants into the subterranean formation; c) subjecting the coated proppants to temperatures within their curing range; and, d) maintaining well conditions to promote agglomeration of the thermoplastic-coated proppant to form an in situ immobile framework of proppant particles. The coated proppant immobile framework is formulated to reduce solid particle flow-back from the subterranean formation. The coated proppant immobile framework is formulated to reduce formation of fines from the subterranean formation and immobile framework.

The following three non-limiting examples illustrate application procedures along with adhesion strengths of annealed polymer coated particulate material that would be experienced in a field test or a real fracturing operation.

Example 1

A coating solution sample of 25 g polyvinyl buytral (PVB) was dissolved into 500 mL ethanol (5% w/v), with the addition of 0.1 wt. % dialdehyde (glyoxal). The solution was spray coated onto 750 g of 16/20 mesh size ceramic particulate material (Carboceramic) using a wurster fluidized bed spray coater (Glatt). The resulting uniform polymer coating was 33 μm in thickness. Sample polymer-coated particulates were capable of being stored for over one year at 38° C. without agglomeration. A slurry of polymer-coated particulate material (30 g) in 1.5 mM HCl (100 mL) was placed into a stainless steel chamber and sealed before heating to 100° C. for 72 hours to replicate well conditions. Consolidated coated particulate material gave an unconstrained adhesion strength of 104 psig resistance.

Example 2

A coating solution sample of 30 g polyvinyl buytral (PVB) was dissolved into 500 mL ethanol (6% w/v), with the addition of 0.1 wt. % dialdehyde (glyoxal). The solution was spray coated onto 750 g of 16/20 mesh size ceramic particulate material (Carboceramic) using a wurster fluidized bed spray coater (Glatt). The resulting uniform polymer coating was 39 μm in thickness. Sample polymer-coated particulates were capable of being stored for over one year at 38° C. without agglomeration. A slurry of polymer-coated particulate material (30 g) in 1.5 mM HCl (100 mL) was placed into a stainless steel chamber and sealed before heating to 100° C. for 72 hours to replicate well conditions.

Consolidated coated particulate material gave an unconstrained adhesion strength of 149 psig resistance.

Example 3

A coating solution sample of 120 lb. polyvinyl buytral (PVB) was dissolved into 180 gallons ethanol (10% w/v), with the addition of 0.1 wt. % dialdehyde (glyoxal). The solution was spray coated onto 3,000 lbs. of 16/20 mesh size ceramic proppant using a wurster fluidized bed spray coater. The resulting uniform coating was about 49 μm in thickness. Sample particulates were capable of being stored for over a year at 38° C. without agglomeration. A slurry of coated proppant (30 g) in 1.5 mM HCl (100 mL) was placed into a stainless steel chamber and sealed before heating to 100° C. for 72 hours to replicate well conditions. Consolidated particles gave unconstrained adhesion strength of 204 psig resistance.

Another non-limiting object of the disclosure is the provision of a method of forming a temporary seal in a well formation.

Another and/or alternative non-limiting object of the disclosure is the provision of a method of forming a temporary seal in a well formation that includes: a) providing a variable stiffness or deformable degradable component capable of forming a fluid seal; b) causing the degradable component to be positioned at or at least partially in an opening located in the well formation that is to be partially or fully sealed; c) causing the degradable component to deform so as to at least partially form a seal in the opening; d) optionally causing the degradable component to agglomerate with other degradable components to form a seal in the opening; and e) causing the first degradable component to partially or fully degrade to cause the first degradable component to be partially or fully removed from the opening.

Another and/or alternative non-limiting object of the disclosure is the provision of a method of forming a temporary seal in a well formation that includes: a) providing a variable stiffness or deformable degradable component capable of forming a fluid seal; b) combining the degradable component with a fluid to be inserted into the well formation; c) inserting the fluid that includes the degradable component into the well formation to cause the degradable component to be positioned at or at least partially in an opening located in the well formation that is to be partially or fully sealed; d) causing the degradable component that is located at or at least partially in the opening to deform so as to at least partially form a seal in the opening so as to partially or fully block or divert a flow of said fluid into and/or through said opening; e) optionally causing the degradable component to agglomerate with other degradable components to form a seal in the opening; and f) causing the degradable component to partially or fully degrade to cause the degradable component to be partially or fully removed from the opening.

Another and/or alternative non-limiting object of the disclosure is the provision of a method of forming a temporary seal in a well formation that includes: a) providing a variable stiffness or deformable degradable component capable of forming a fluid seal; b) combining the degradable component with a fluid to be inserted into the well formation; c) inserting the fluid that includes the degradable component into the well formation to cause the degradable component to be positioned at or at least partially in an opening located in the well formation that is to be partially or fully sealed; d) causing the degradable component that is located at or at least partially in the opening to deform so as to at least partially form a seal in the opening so as to partially or fully block or divert a flow of said fluid into and/or through said opening, and wherein the first degradable component caused to be at least partially deformed by fluid pressure of the fluid; e) optionally causing the degradable component to agglomerate with other degradable components to form a seal in the opening; and f) causing the degradable component to partially or fully degrade to cause the degradable component to be partially or fully removed from the opening to thereby allow 80-100% of fluid flow rates (and all values and ranges therebetween) into the opening that existed prior to the degradable component partially or fully sealing the opening.

Another and/or alternative non-limiting object of the disclosure is the provision of a method of forming a temporary seal in a well formation that includes: a) providing a variable stiffness or deformable degradable component capable of forming a fluid seal; b) combining the degradable component with a fluid to be inserted into the well formation; c) inserting the fluid that includes the degradable component into the well formation to cause the degradable component to be positioned at or at least partially in an opening located in the well formation that is to be partially or fully sealed; d) causing the degradable component that is located at or at least partially in the opening to deform so as to at least partially form a seal in the opening so as to partially or fully block or divert a flow of said fluid into and/or through said opening, and wherein the first degradable component caused to be at least partially deformed by fluid pressure of the fluid; e) optionally causing the degradable component to agglomerate with other degradable components to form a seal in the opening; f) performing operations such as drilling, circulating, pumping, and/or hydraulic fracturing in the well formation for a period of time after the degradable component has deformed and at least partially sealed the opening; and g) causing the degradable component to partially or fully degrade to cause the degradable component to be partially or fully removed from the opening to thereby allow 80-100% of fluid flow rates (and all values and ranges therebetween) into the opening that existed prior to the degradable component partially or fully sealing the opening.

Another and/or alternative non-limiting object of the disclosure is the provision of a method of forming a temporary seal in a well formation wherein the first degradable component has a size and shape that inhibits or prevents the degradable component from fully passing through the opening to be sealed.

Another and/or alternative non-limiting object of the disclosure is the provision of a method of forming a temporary seal in a well formation wherein the step of causing the degradable component to partially or fully degrade is at least partially accomplished by a) changing a temperature of the fluid in contact with the degradable component, b) changing a pressure of the fluid in contact with the degradable component, c) changing a composition of the fluid in contact with the degradable component, d) changing a pH of the fluid in contact with the first degradable component, e) changing a salinity of the fluid in contact with the first degradable component, and/or f) selecting a composition of the degradable component that dissolves or degrades at a certain rate when exposed to the fluid.

Another and/or alternative non-limiting object of the disclosure is the provision of a method of forming a temporary seal in a well formation further including the steps of a) adding a second degradable component to the fluid; b)

inserting the fluid that includes the second degradable component into the well formation to cause the second degradable component to be positioned at or at least partially in an opening located in the well formation that is to be partially or fully sealed, the second degradable component is inserted into the well formation after the first degradable component has been deformed at least partially sealed said opening; c) causing the second degradable component that is located at the opening to deform to cause further sealing of the opening, and wherein the second degradable component is caused to be at least partially deformed by fluid pressure of the fluid, and wherein the second degradable component is formed of a same or different material as the degradable component; and d) optionally causing the first and/or second degradable component to agglomerate with other degradable components to form a seal in the opening.

Another and/or alternative non-limiting object of the disclosure is the provision of a method of forming a temporary seal in a well formation wherein an average size of the second degradable component is 10-90% (and all values and ranges therebetween) smaller than an average size of the degradable component.

Another and/or alternative non-limiting object of the disclosure is the provision of a method of forming a temporary seal in a well formation wherein the degradable component has a density that is a) ±20% (0–±20 and all values and ranges therebetween) a density of the fluid, or b) ±20% (0–±20 and all values and ranges therebetween) a density of sand, frac balls, and/or proppant in the fluid.

Another and/or alternative non-limiting object of the disclosure is the provision of a method of forming a temporary seal in a well formation wherein the first degradable component is a) a degradable metal and 10-80 vol. % (and all values and ranges therebetween) of a stiffness component, or b) degradable elastomer or polymer and 10-80 vol. % (and all values and ranges therebetween) of a stiffness component.

Another and/or alternative non-limiting object of the disclosure is the provision of a method of forming a temporary seal in a well formation wherein the first degradable component is formed of the degradable elastomer or polymer and the stiffness component, and wherein the degradable elastomer or polymer form a continuous phase in said first degradable component.

Another and/or alternative non-limiting object of the disclosure is the provision of a method of forming a temporary seal in a well formation wherein the degradable component is formed of the degradable elastomer or polymer and the stiffness component, and wherein the degradable elastomer or polymer has a 50-100 shore A hardness (and all values and ranges therebetween).

Another and/or alternative non-limiting object of the disclosure is the provision of a method of forming a temporary seal in a well formation wherein the degradable component is formed of the degradable elastomer or polymer and the stiffness component, and wherein the degradable elastomer or polymer has a strain to failure in tension or compression of at least 20%.

Another and/or alternative non-limiting object of the disclosure is the provision of a method of forming a temporary seal in a well formation wherein the degradable component is formed of the degradable elastomer or polymer and the stiffness component, and wherein the stiffness component forms a discontinuous second phase in the degradable component.

Another and/or alternative non-limiting object of the disclosure is the provision of a method of forming a temporary seal in a well formation wherein the degradable component is formed of the degradable elastomer or polymer and the stiffness component, and wherein the stiffness component i) has a stiffness or hardness at of least 5 times a stiffness or hardness of the degradable elastomer or polymer, and/or ii) allows for deformation of the degradable component when said first degradable component is exposed to a force that is 10-75% (and all values and ranges therebetween) of a strength of the first degradable component prior to being deformed.

Another and/or alternative non-limiting object of the disclosure is the provision of a method of forming a temporary seal in a well formation wherein the degradable component is formed of the degradable elastomer or polymer and the stiffness component, and wherein the stiffness or yield strength of the degradable component changes when the degradable component deforms.

Another and/or alternative non-limiting object of the disclosure is the provision of a method of forming a temporary seal in a well formation wherein the degradable component is formed of the degradable elastomer or polymer and the stiffness component, and wherein a maximum stiffness and/or yield strength of said degradable component after deformation of the degradable component is at least 1.3 times (e.g., at least 1.5 times, at least 3 times, at least 5 times, 1.3-10 times (and all values and ranges therebetween), etc.) a stiffness of the degradable component prior to deformation of the degradable component.

Another and/or alternative non-limiting object of the disclosure is the provision of a method of forming a temporary seal in a well formation wherein the degradable component is formed of the degradable elastomer or polymer and the stiffness component, and wherein the stiffness component includes one or more of a flake, fiber, foil, microballoon, ribbon, sphere, and/or particle shape.

Another and/or alternative non-limiting object of the disclosure is the provision of a method of forming a temporary seal in a well formation wherein the degradable component is formed of the degradable elastomer or polymer and the stiffness component, and wherein the stiffness component is uniformly dispersed in the degradable component.

Another and/or alternative non-limiting object of the disclosure is the provision of a method of forming a temporary seal in a well formation wherein the degradable component is formed of the degradable elastomer or polymer and the stiffness component, and wherein 80-100% (and all values and ranges therebetween) of the stiffness component (and all values and ranges therebetween) is located inwardly from an outer surface of the degradable component.

Another and/or alternative non-limiting object of the disclosure is the provision of a method of forming a temporary seal in a well formation wherein the degradable component is formed of the degradable elastomer or polymer and the stiffness component, and wherein the stiffness component is aligned perpendicular to a primary direction of strain of the degradable component.

Another and/or alternative non-limiting object of the disclosure is the provision of a method of forming a temporary seal in a well formation wherein the degradable component is formed of the degradable elastomer or polymer and the stiffness component, and wherein the stiffness component is aligned parallel to a principle direction of strain of the degradable component.

Another and/or alternative non-limiting object of the disclosure is the provision of a method of forming a temporary seal in a well formation wherein the degradable component is formed of the degradable elastomer or polymer and the stiffness component, and wherein the stiffness component includes one or more fillers selected from the group consisting of calcium carbonate, titanium dioxide, silica, talc, mica, sand, gravel, crushed rock, bauxite, granite, limestone, sandstone, glass beads, aerogels, xerogels, clay, alumina, kaolin, microspheres, hollow glass spheres, porous ceramic spheres, gypsum dihydrate, insoluble salts, magnesium carbonate, calcium hydroxide, calcium aluminate, and/or magnesium carbonate.

Another and/or alternative non-limiting object of the disclosure is the provision of a method of forming a temporary seal in a well formation wherein the degradable component is formed of the degradable elastomer or polymer and the stiffness component, and wherein the degradable elastomer or polymer includes an elastomeric material including at least two phases, a first phase including one or more of natural rubber, vulcanized rubber, silicone, polyurethane, synthetic rubber, polybutadienece, nitrile rubber (NBR), polyisobutylene, acrylater-butadinene rubber, and/or styrene butadine rubber, and a second phase including one or more of polyvinyl alcohol (PVA), poly vinyl chloride (PVC), polyethylene glycol, polylactic acid (PLA), polyvinylpyrodilone or polymer derivatives of acrylic and/or methacrylic acid.

Another and/or alternative non-limiting object of the disclosure is the provision of a method of forming a temporary seal in a well formation wherein the degradable component is formed of the degradable elastomer or polymer and the stiffness component, and wherein the degradable metal is a degradable magnesium alloy, a degradable aluminum alloy, or degradable zinc alloy.

Another and/or alternative non-limiting object of the disclosure is the provision of a method of forming a temporary seal in a well formation wherein the degradable component is formed of the degradable elastomer or polymer and the stiffness component, and wherein a density of the degradable elastomer or polymer is 0.01-1.2 g/cc (and all values and ranges therebetween).

Another and/or alternative non-limiting object of the disclosure is the provision of a method of forming a temporary seal in a well formation wherein the degradable component has a density of said first degradable component is 0.95-1.3 g/cc (and all values and ranges therebetween).

Another and/or alternative non-limiting object of the disclosure is the provision of a method of forming a temporary seal in a well formation wherein the degradable component includes a swellable component that increases in volume upon exposure to the fluid.

Another and/or alternative non-limiting object of the disclosure is the provision of a method of forming a temporary seal in a well formation further including the step of adding a swellable component to the fluid during or after the degradable component is inserted into the well formation.

Another and/or alternative non-limiting object of the disclosure is the provision of a method of forming a temporary seal in a well formation wherein the opening in the well formation is a wellbore, perforation, fracture, channel, slot, hole, other subsurface or subsea opening, seat of a diverter, seat of a valve, and/or a channel.

Another and/or alternative non-limiting object of the disclosure is the provision of a method of forming a temporary seal in a well formation wherein the degradable component is in the form of a diverter ball, a diverter shape, or a diverter plug.

Another and/or alternative non-limiting object of the disclosure is the provision of a method of forming a temporary seal in a well formation wherein the degradable component is in the form of a ball or shape having at least one dimension of 0.3-1.5 in. (and all values and ranges therebetween).

Another and/or alternative non-limiting object of the disclosure is the provision of a method of forming a temporary seal in a well formation wherein the degradable component is used as a sealing or packing element or component as part of a plug, seal, wiper, dart, valve, or other device useful for controlling flow or short-time sealing of a wellbore, pipe, channel, fracture, annulus, liner, or other subsea structure or annulus.

Another and/or alternative non-limiting object of the disclosure is the provision of a method of forming a temporary seal in a well formation wherein the step of causing the degradable component to partially or fully degrade includes reducing a pH of the fluid to cause partial or full solubilizing of the degradable component.

Another and/or alternative non-limiting object of the disclosure is the provision of a method of forming a temporary seal in a well formation wherein the step of causing the degradable component to partially or fully degrade includes adding to the fluid one or more of an acid, green acid, gelbreaker, delay action gelbreaker, coated ammonium sulfate, buffered solution, sulfate, chloride, oxidizing, or reducing fluid.

Another and/or alternative non-limiting object of the disclosure is the provision of a method of forming a temporary seal in a well formation wherein the fluid includes freshwater, brine, completion fluid, produced water, or drilling mud.

Another and/or alternative non-limiting object of the disclosure is the provision of a method of forming a temporary seal in a well formation wherein the degradable component is used during a well completion process to divert fluid flow away from one or more openings in the well formation.

Another and/or alternative non-limiting object of the disclosure is the provision of a method of forming a temporary seal in a well formation wherein the degradable component is used in an open hole completion process to temporarily seal fractures and reduce fluid loss during a drilling operation.

Another and/or alternative non-limiting object of the disclosure is the provision of a variable stiffness or deformable degradable component formed of a) degradable metal and 10-80 vol. % of a stiffness component, orb) degradable elastomer or polymer and 10-80 vol. % of a stiffness component.

Another and/or alternative non-limiting object of the disclosure is the provision of a sealing arrangement that uses an engineered degradable thermoplastic elastomer or degradable metallic device to form seals in various openings in a well formation.

Another and/or alternative non-limiting object of the disclosure is the provision of a sealing arrangement that uses an engineered degradable thermoplastic elastomer or degradable metallic device to form seals in various openings in a well formation by causing the engineered degradable thermoplastic elastomer or degradable metallic device to deform at the opening in the well formation.

Another and/or alternative non-limiting object of the disclosure is the provision of a sealing arrangement that uses an engineered degradable thermoplastic elastomer or degradable metallic device that causes in the stiffness and/or strength of the engineered degradable thermoplastic elastomer or degradable metallic device to increase when deformed.

Another and/or alternative non-limiting object of the disclosure is the provision of a sealing arrangement using an engineered degradable thermoplastic elastomer or degradable metallic device that can have its density controlled (e.g., neutrally buoyant) to facilitate placement of the engineered degradable thermoplastic elastomer or degradable metallic device at or partially in the opening in the well formation.

Another and/or alternative non-limiting object of the disclosure is the provision of a sealing arrangement using an engineered degradable thermoplastic elastomer or degradable metallic device that is formulated to dissolve/degrade (e.g., dissolve/degrade in a completion fluid, including brine, guar gel, freshwater, produced water, etc., as a function of temperature or time, or accelerated or initiated under the action of a gelbreaker or other activator or controlled fluid) so that the deformed engineered degradable thermoplastic elastomer or degradable metallic device can be removed from the opening in the well formation, thereby resulting in the unsealing of the opening in the well formation.

Another and/or alternative non-limiting object of the disclosure is the provision of a sealing arrangement using an engineered degradable thermoplastic elastomer or degradable metallic device formulated to dissolve/degrade so that it can be safety removed from the opening without damaging the well formation.

Another and/or alternative non-limiting object of the disclosure is the provision of a sealing arrangement using an engineered degradable thermoplastic elastomer or degradable metallic device that increases in stiffness and/or hardness when the variable stiffness engineered degradable thermoplastic elastomer is deformed, thereby resulting in a less deformation of the variable stiffness engineered degradable thermoplastic elastomer.

Another and/or alternative non-limiting object of the disclosure is the provision of a sealing arrangement using an engineered degradable thermoplastic elastomer or degradable metallic device that is able to deform a certain amount to partially or fully conform to a shape of an opening in the well formation to thereby create a seal in/about the opening, and to thereafter resist further deformation so as to maintain the deformed shape to thereby maintain the seal in/about the opening.

Another and/or alternative non-limiting object of the disclosure is the provision of a sealing arrangement using an engineered degradable thermoplastic elastomer or degradable metallic device designed to deform about 10-75% (and all values and ranges therebetween).

Another and/or alternative non-limiting object of the disclosure is the provision of a sealing arrangement using an engineered degradable thermoplastic elastomer or degradable metallic device including a stiffening component in the form of hard spheres (e.g., microballoons, solid spheres, etc.) added at 10-70 vol. % (and all values and ranges therebetween) to a dissolvable elastomer matrix or degradable metal material.

Another and/or alternative non-limiting object of the disclosure is the provision of a sealing arrangement using an engineered degradable thermoplastic elastomer or degradable metallic device including a stiffening component in the form of hard spheres that are generally uniformly dispersed in the dissolvable elastomer or degradable metal material prior to deformation of the engineered degradable thermoplastic elastomer or degradable metallic device.

Another and/or alternative non-limiting object of the disclosure is the provision of a sealing arrangement using an engineered degradable thermoplastic elastomer or degradable metallic device including a stiffening component in the form of hard spheres wherein a crush strength of the hard spheres is 500-10,000 psi (and all values and ranges therebetween).

Another and/or alternative non-limiting object of the disclosure is the provision of a sealing arrangement using an engineered degradable thermoplastic elastomer or degradable metallic device including a stiffening component in the form of a crimped stiffness component (e.g., metal component, graphite component, plastic component, etc.).

Another and/or alternative non-limiting object of the disclosure is the provision of a sealing arrangement using an engineered degradable thermoplastic elastomer or degradable metallic device including a stiffening component in the form of a crimped stiffness component that can have a variety of shapes (e.g., repeating V-shape, sinusoidal shape, other non-straight shape, etc.).

Another and/or alternative non-limiting object of the disclosure is the provision of a sealing arrangement using an engineered degradable thermoplastic elastomer or degradable metallic device including a stiffening component in the form of a plurality of flakes or fibers.

Another and/or alternative non-limiting object of the disclosure is the provision of a sealing arrangement using an engineered degradable thermoplastic elastomer or degradable metallic device that can be fabricated in situ in the well formation.

Another and/or alternative non-limiting object of the disclosure is the provision of a sealing arrangement using an engineered degradable thermoplastic elastomer or degradable metallic device including the use of metal encapsulation of all or part of the degradable elastomer (e.g., elastomer-filled degradable metal tube or shape/extrusion), wound or laminated structure, or stacked ring or cone structure to prevent extrusion and enable higher pressure ratings to be met.

Another and/or alternative non-limiting object of the disclosure is the provision of a sealing arrangement using an engineered degradable thermoplastic elastomer including degradable polymers (elastomers, PVA, PLA, and PGA and their mixtures, PEG, cellulistic polymers, nylon) that are particularly degradable with $CaO$, $Na_2O$, $BaSO_4$, $NH_3SO_4$, or other high or low pH creating additions when in contact with water.

Another and/or alternative non-limiting object of the disclosure is the provision of a sealing arrangement using an engineered degradable thermoplastic elastomer or degradable metallic device having a density that is the same or similar to the sand or proppant-water mixture density used in the completion process, such that the flow of the diverter or frac balls matches the flow of the completion fluid.

Another and/or alternative non-limiting object of the disclosure is the provision of a sealing arrangement using an engineered degradable thermoplastic elastomer or degradable metallic device having a density of 0.95-1.4 g/cc (and all values and ranges therebetween).

Another and/or alternative non-limiting object of the disclosure is the provision of a sealing arrangement using an engineered degradable thermoplastic elastomer or degradable metallic device including a degradable polymer coating that partially or fully forms an outer coating.

Another and/or alternative non-limiting object of the disclosure is the provision of a sealing arrangement using an engineered degradable thermoplastic elastomer or degradable metallic device including a degradable polymer coating that partially or fully forms an outer coating, and having a coating thickness of 0.001-0.3 in. (and all values and ranges therebetween).

Another and/or alternative non-limiting object of the disclosure is the provision of a sealing arrangement using an engineered degradable thermoplastic elastomer or degradable metallic device that includes a central cavity.

Another and/or alternative non-limiting object of the disclosure is the provision of a sealing arrangement using an engineered degradable thermoplastic elastomer or degradable metallic device including a central cavity and/or microballoons to control a density of the engineered degradable thermoplastic elastomer or degradable metallic device.

Another and/or alternative non-limiting object of the disclosure is the provision of a sealing arrangement using an engineered degradable thermoplastic elastomer or degradable metallic device including a central cavity that constitutes no more than 70 vol. % (e.g., 0.5-70 vol. % and all values and ranges therebetween) of the total volume of the engineered degradable thermoplastic elastomer or degradable metallic device.

Another and/or alternative non-limiting object of the disclosure is the provision of a sealing arrangement using an engineered degradable thermoplastic elastomer or degradable metallic device having a V-shape or conical shape, with or without tails.

Another and/or alternative non-limiting object of the disclosure is the provision of a sealing arrangement using an engineered degradable thermoplastic elastomer formed of about 20-70 vol. % (and all values and ranges therebetween) soda lime glass microballoons having a particle size of 10-1000 mm (and all values and ranges therebetween), and having a density of about 0.1-0.6 g/cc (and all values and ranges therebetween) and 10-60 vol. % (and all values and ranges therebetween) powdered elastomer (e.g., nitrile-butadiene rubber) particles and 10-60 vol. % (and all values and ranges therebetween) polyvinyl alcohol, and a density of 0.9-1.2 g/cc (and all values and ranges therebetween).

Another and/or alternative non-limiting object of the disclosure is the provision of a sealing arrangement using an engineered degradable thermoplastic elastomer formed of about 20-70 vol. % (and all values and ranges therebetween) soda lime glass microballoons having a particle size of 10-1000 μm (and all values and ranges therebetween), having a density of about 0.1-0.6 g/cc (and all values and ranges therebetween) and 10-60 vol. % (and all values and ranges therebetween) powdered elastomer particles and 10-60 vol. % (and all values and ranges therebetween) polyvinyl alcohol, a density of 0.9-1.2 g/cc (and all values and ranges therebetween), and wherein the engineered degradable thermoplastic elastomer had a strength of 800-2000 psi (and all values and ranges therebetween) for at least two hours in tap water at 51.7° C.

Another and/or alternative non-limiting object of the disclosure is the provision of a sealing arrangement using an engineered degradable thermoplastic elastomer formed of about 20-70 vol. % (and all values and ranges therebetween) soda lime glass microballoons having a particle size of 10-1000 μm (and all values and ranges therebetween), a density of about 0.1-0.6 g/cc (and all values and ranges therebetween) and 10-60 vol. % (and all values and ranges therebetween) powdered elastomer particles and 10-60 vol. % (and all values and ranges therebetween) polyvinyl alcohol, a density of 0.9-1.2 g/cc (and all values and ranges therebetween), and wherein the engineered degradable thermoplastic elastomer has a weight loss of 20-60% (and all values and ranges therebetween) over a period of 20-120 hours (and all values and ranges therebetween) in tap water at 51.7° C., and which left particles in the range of 20-200 μm (and all values and ranges therebetween).

Another and/or alternative non-limiting object of the disclosure is the provision of a sealing arrangement using an engineered degradable metallic device including a degradable metal alloy and microballoons.

Another and/or alternative non-limiting object of the disclosure is the provision of a sealing arrangement using an engineered degradable metallic device including a degradable metal alloy and microballoons, wherein the degradable metal alloy is degradable cast magnesium composite or a degradable powdered metallurgy magnesium composite.

Another and/or alternative non-limiting object of the disclosure is the provision of a sealing arrangement using an engineered degradable metallic device including a degradable metal alloy and microballoons, wherein the degradable metal alloy is degradable cast composite that includes greater than 50 wt. % magnesium, zinc, or aluminum; and about 0.5-49.5 wt. % (and all values and ranges therebetween) of additive (e.g., aluminum, zinc, tin, beryllium, boron carbide, copper, nickel, bismuth, cobalt, titanium, manganese, potassium, sodium, antimony, indium, strontium, barium, silicon, lithium, silver, gold, cesium, gallium, calcium, iron, lead, mercury, arsenic, rare earth metals [e.g., yttrium, lanthanum, samarium, europium, gadolinium, terbium, dysprosium, holmium, ytterbium, etc.], and zirconium).

Another and/or alternative non-limiting object of the disclosure is the provision of a sealing arrangement using an engineered degradable metallic device including a degradable metal alloy and microballoons, wherein the degradable metal alloy has a dissolution rate of at least 5 mg/cm$^2$-hr. in 3 wt. % KCl at 90° C. (e.g., 40-325 mg/cm$^2$/hr. in 3 wt. % KCl water mixture at 90° C., 50-325 mg/cm$^2$/hr. in 3 wt. % KCl water mixture at 90° C.; 75-325 mg/cm$^2$/hr. in 3 wt. % KCl water mixture at 90° C.; 84-325 mg/cm$^2$/hr. in 3 wt. % KCl water mixture at 90° C.; 100-325 mg/cm$^2$/hr. in 3 wt. % KCl water mixture at 90° C.; 110-325 mg/cm$^2$/hr. in 3 wt. % KCl water mixture at 90° C.).

Another and/or alternative non-limiting object of the disclosure is the provision of a sealing arrangement using an engineered degradable metallic device including a degradable metal alloy and microballoons, wherein the degradable metal alloy has a dissolution rate of up to 1 mg/cm$^2$/hr. in 3 wt. % KCl water mixture at 20° C.

Another and/or alternative non-limiting object of the disclosure is the provision of a sealing arrangement using an engineered degradable metallic device including a degradable metal alloy and microballoons, wherein the degradable metal alloy is a degradable powdered metallurgy magnesium composite formed from compression and/or sintering.

Another and/or alternative non-limiting object of the disclosure is the provision of a sealing arrangement using an engineered degradable metallic device including a degradable metal alloy and microballoons, wherein the degradable metal alloy is a degradable powdered metallurgy magnesium composite formed from one or more reactive metals selected from calcium, magnesium, and aluminum, and one or more secondary metals such as lithium, gallium, indium, zinc, bismuth, calcium, magnesium, tin, copper, silver, cadmium, and lead.

Another and/or alternative non-limiting object of the disclosure is the provision of a sealing arrangement using an engineered degradable metal alloy and microballoons, wherein the degradable metal alloy is a degradable magnesium alloy.

Another and/or alternative non-limiting object of the disclosure is the provision of a sealing arrangement using an engineered degradable metallic device including a degradable metal alloy and microballoons, wherein the microballoons constitute 20-60 vol. % (and all values and ranges therebetween) of the engineered degradable metallic device.

Another and/or alternative non-limiting object of the disclosure is the provision of a sealing arrangement using an engineered degradable metallic device including a degradable metal alloy and microballoons, wherein the microballoons have a crush strength of 500-10,000 psi (and all values and ranges therebetween).

Another and/or alternative non-limiting object of the disclosure is the provision of a sealing arrangement using a variable stiffness engineered degradable thermoplastic elastomer ball or seal or degradable metallic composite ball or seal formed into a diverter ball and inserted into a flowing completion fluid, and wherein the diverter ball has a near neutral buoyancy to the completion fluid to enable the diverter ball to follow the main flow of the completion fluid in the well formation, and then enable the diverter ball to be seated into the opening in the well formation.

Another and/or alternative non-limiting object of the disclosure is the provision of a sealing arrangement using a variable stiffness engineered degradable thermoplastic elastomer ball or seal or degradable metallic composite ball or seal formed into a diverter ball that are locally deformed at the edges to partially conform to the opening geometry in the well formation, and to divert 70-100 vol. % (and all values and ranges therebetween) of the flow of the completion fluid to other openings in the well formation.

Another and/or alternative non-limiting object of the disclosure is the provision of a sealing arrangement using a variable stiffness engineered degradable thermoplastic elastomer ball or seal or degradable metallic composite ball or seal formed into a diverter ball and periodically inserted into a flowing completion fluid to increase fracture uniformity and sand placement in the well formation.

Another and/or alternative non-limiting object of the disclosure is the provision of a sealing arrangement using a variable stiffness engineered degradable thermoplastic elastomer ball or seal or degradable metallic composite ball or seal that can be removed from the well formation by use of a gelbreaker, buffered pH addition (e.g., monosodium sulfate, etc.) that was added to the completion fluid.

Another and/or alternative non-limiting object of the disclosure is the provision of a sealing arrangement using a variable stiffness engineered degradable thermoplastic elastomer ball or seal or degradable metallic composite ball or seal having a controlled crush strength or a controlled plastically deformable matrix.

Another and/or alternative non-limiting object of the disclosure is the provision of a sealing arrangement using a variable stiffness engineered degradable thermoplastic elastomer ball or seal or degradable metallic composite ball or seal that can include high aspect metallic flakes, wires, or foil that can deform, form a network, and/or create a seal of an opening (e.g., a fracture, wellbore, perforation, slot, hole, channel, other subsurface or subsea opening, and/or seat of a diverter or valve).

Another and/or alternative non-limiting object of the disclosure is the provision of a sealing arrangement using a variable stiffness engineered degradable thermoplastic elastomer ball or seal or degradable metallic composite ball or seal that can be removed through the action of a fluid and, with the addition of a clean-up fluid (e.g., gelbreaker or acid), can be completely removed, leaving no debris which can contaminate the formation or wellbore.

Another and/or alternative non-limiting object of the disclosure is the provision of a sealing arrangement using a variable stiffness engineered degradable thermoplastic elastomer ball or seal or degradable metallic composite ball or seal that can be a castable, moldable, or extrudable structure and can be assembled or structured using additive manufacturing, injection or compression molding, gluing, assembly, pressing, casting, forging, powder metallurgy, or other fabrication and forming techniques.

Another and/or alternative non-limiting object of the disclosure is the provision of a sealing arrangement using a variable stiffness engineered degradable thermoplastic elastomer ball or seal or degradable metallic composite ball or seal that can be used in down hole wells as a diversion system, including a) one or more degradable materials; b) a higher stiffness component, such as a core, center, sphere, ellipsoid, wedge or other higher stiffness, thicker cross-section; and c) one or more lower stiffness-, lower thickness-shaped components that are easily deformed, such as a ring, flap, conical, or tubular section.

Another and/or alternative non-limiting object of the disclosure is the provision of a sealing arrangement using a variable stiffness engineered degradable thermoplastic elastomer ball or seal or degradable metallic composite ball or seal including an added overall extension flap or ring.

Another and/or alternative non-limiting object of the disclosure is the provision of a sealing arrangement using a variable stiffness engineered degradable thermoplastic elastomer ball or seal or degradable metallic composite ball or seal wherein the core and the added extension may be the same or different degradable materials, where the extension is deformable and chosen from a degradable polymer, degradable elastomer, or degradable metal.

Another and/or alternative non-limiting object of the disclosure is the provision of a sealing arrangement using a variable stiffness engineered degradable thermoplastic elastomer ball or seal or degradable metallic composite ball or seal in which an added extension or added shape is added to a thicker cross-section core which can be a sphere, ellipsoid, conical section, cube, or other shape being equiaxed or having an aspect ratio of 1 and 8 (and all values and ranges therebetween), where such added extension or shape creates drag during flow and keeps the component orientated in a flowing fluid so that it can be orientated into the hole that needs to be plugged.

Another and/or alternative non-limiting object of the disclosure is the provision of a sealing arrangement using a variable stiffness engineered degradable thermoplastic elastomer ball or seal or degradable metallic composite ball or seal having an added extension or added shape such as, but not limited to, a tail or a string.

Another and/or alternative non-limiting object of the disclosure is the provision of a sealing arrangement using a variable stiffness engineered degradable thermoplastic elastomer ball or seal or degradable metallic composite ball or seal having one or more features performing both functions of improved sealing and directional orientation.

Another and/or alternative non-limiting object of the disclosure is the provision of a sealing arrangement using a variable stiffness engineered degradable thermoplastic elastomer ball or seal or degradable metallic composite ball or seal having one or more oblong features that improve the seal by the device when plugging irregular holes.

Another and/or alternative non-limiting object of the disclosure is the provision of a sealing arrangement using a variable stiffness engineered degradable thermoplastic elastomer ball or seal or degradable metallic composite ball or seal having a density of 0.8-1.2 g/cc (and all values and ranges therebetween) also known as a neutral buoyancy component.

Another and/or alternative non-limiting object of the disclosure is the provision of a sealing arrangement using a variable stiffness engineered degradable thermoplastic elastomer ball or seal or degradable metallic composite ball or seal fabricated by, but not limited to, injection molding, compression molding, extrusion, press and sinter, additive manufacturing, casting, machining, or a combination of two or more of these techniques.

Another and/or alternative non-limiting object of the disclosure is the provision of a sealing arrangement using a variable stiffness engineered degradable thermoplastic elastomer ball or seal or degradable metallic composite ball or seal wherein the core of the ball or seal is metallic and added features on the outside are rubber polymeric or other flexible material including, but not limited to, degradable rubber.

Another and/or alternative non-limiting object of the disclosure is the provision of a sealing arrangement using a variable stiffness engineered degradable thermoplastic elastomer ball or seal or degradable metallic composite ball or seal wherein the metal in the ball or seal is a dissolvable material including, but not limited to, modified magnesium, aluminum, and/or zinc.

Another and/or alternative non-limiting object of the disclosure is the provision of a sealing arrangement using a variable stiffness engineered degradable thermoplastic elastomer ball or seal or degradable metallic composite ball or seal including a hollow metallic core to achieve a density of 0.8-1.2 g/cc (and all values and ranges therebetween), and where the core and the tail or extensions may be different densities.

Another and/or alternative non-limiting object of the disclosure is the provision of a sealing arrangement using a variable stiffness engineered degradable thermoplastic elastomer ball or seal or degradable metallic composite ball or seal for temporarily blocking a perforation, fracture, opening, leak, crack, slot, or other opening to hinder and/or prevent flow through such perforation, fracture, opening, leak, crack, slot, or other opening perforation, fracture, opening, leak, crack, slot, or other opening.

Another and/or alternative non-limiting object of the disclosure is the provision of a sealing arrangement using a variable stiffness engineered degradable thermoplastic elastomer ball or seal or degradable metallic composite ball or seal used in an oil and gas operation to 1) restore circulation by reducing or preventing mud or fluid loss, 2) divert flow during fracturing, 3) temporarily seal perforations, and/or 4) limit entry holes for workover or other operation.

Another and/or alternative non-limiting object of the disclosure is the provision of a sealing arrangement using a variable stiffness engineered degradable thermoplastic elastomer ball or seal or degradable metallic composite ball or seal formed of a material wherein the degradation of variable stiffness engineered degradable thermoplastic elastomer ball or seal or degradable metallic composite ball or seal can be triggered or controlled by time, pH, temperature, fluid type, salinity, pressure, or other chemical and/or physical trigger to reverse the sealing and restore fluid flow.

Another and/or alternative non-limiting object of the disclosure is the provision of a sealing arrangement using a variable stiffness engineered degradable thermoplastic elastomer ball or seal or degradable metallic composite ball or seal formed of a material that can be added during pumping in a controlled manner, such as through a sequenced feeder, rotary pressure lock, or other mechanism to load 1-1000 (and all values and ranges therebetween) devices into a fluid stream in a controlled manner, in groups of 1-20 devices (and all values and ranges therebetween).

Another and/or alternative non-limiting object of the disclosure is the provision of a sealing arrangement using a variable stiffness engineered degradable thermoplastic elastomer ball or seal or degradable metallic composite ball or seal having a major dimension of 1-300 mm (and all values and ranges therebetween).

Other aspects, advantages, and novel features of the present disclosure will become apparent from the following detailed description of the disclosure when considered in conjunction with the accompanying drawings.

BRIEF DESCRIPTION OF THE DRAWINGS

Reference may now be made to the drawings, which illustrate various embodiments that the disclosure may take in physical form and in certain parts and arrangements of parts wherein:

FIGS. 10-14 illustrate various non-limiting configurations of deformable structures that can be used on the variable stiffness engineered degradable thermoplastic elastomer ball or seal or degradable metallic composite ball or seal.

DETAILED DESCRIPTION OF NON-LIMITING EMBODIMENTS

Figure 1:
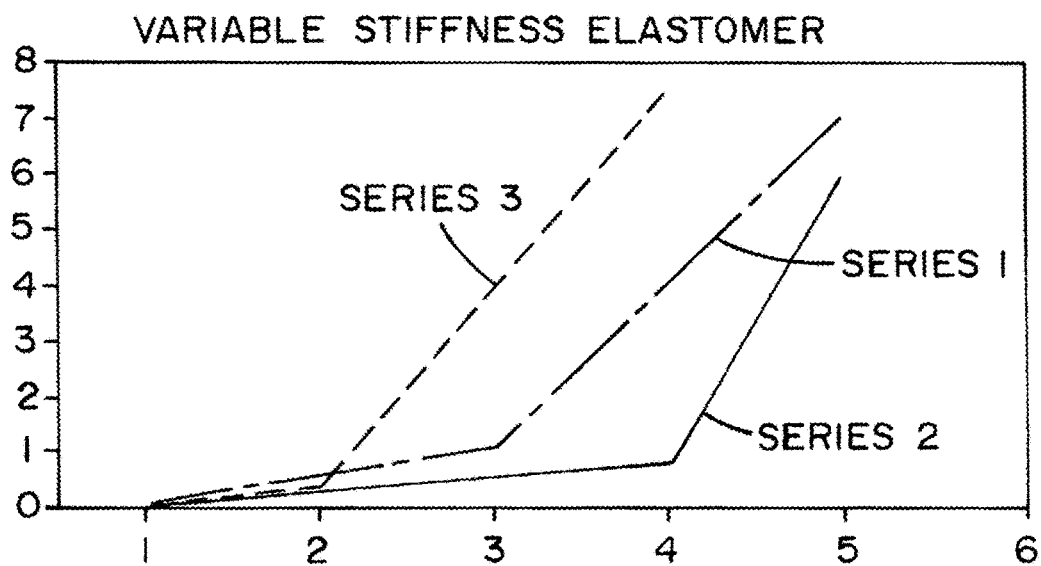
FIG. 1 illustrates the stress versus displacement for three different variable stiffness elastomer composites.

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, all the intermediate values and all intermediate ranges).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

The disclosure is directed to a sealing arrangement using an engineered degradable thermoplastic elastomer or degradable metallic device (e.g., degradable metallic ball, etc.) to form seals in various openings in a well formation. The sealing of the engineered degradable thermoplastic elastomer or degradable metallic device is achieved by causing the engineered degradable thermoplastic elastomer or degradable metallic device to deform at the opening in the well formation. The deformation of the engineered degradable thermoplastic elastomer or degradable metallic device causes the stiffness and/or strength of the engineered degradable thermoplastic elastomer or degradable metallic device to increase. The density of the engineered degradable thermoplastic elastomer or degradable metallic device can be controlled (e.g., neutrally buoyant) to facilitate placement of the engineered degradable thermoplastic elastomer or degradable metallic device at or partially in the opening in the well formation. The engineered degradable thermoplastic elastomer or degradable metallic device is formulated to dissolve/degrade (e.g., dissolve/degrade in a completion fluid, including brine, guar gel, freshwater, produced water, etc., as a function of temperature or time, or accelerated or initiated under the action of a gelbreaker or other activator or controlled fluid) so the deformed engineered degradable thermoplastic elastomer or degradable metallic device can be removed from the opening in the well formation, thereby resulting in the unsealing of the opening in the well formation. The engineered degradable thermoplastic elastomer or degradable metallic device is formulated to dissolve/degrade to be safely removed from the opening without damaging the well formation.

Figure 5:
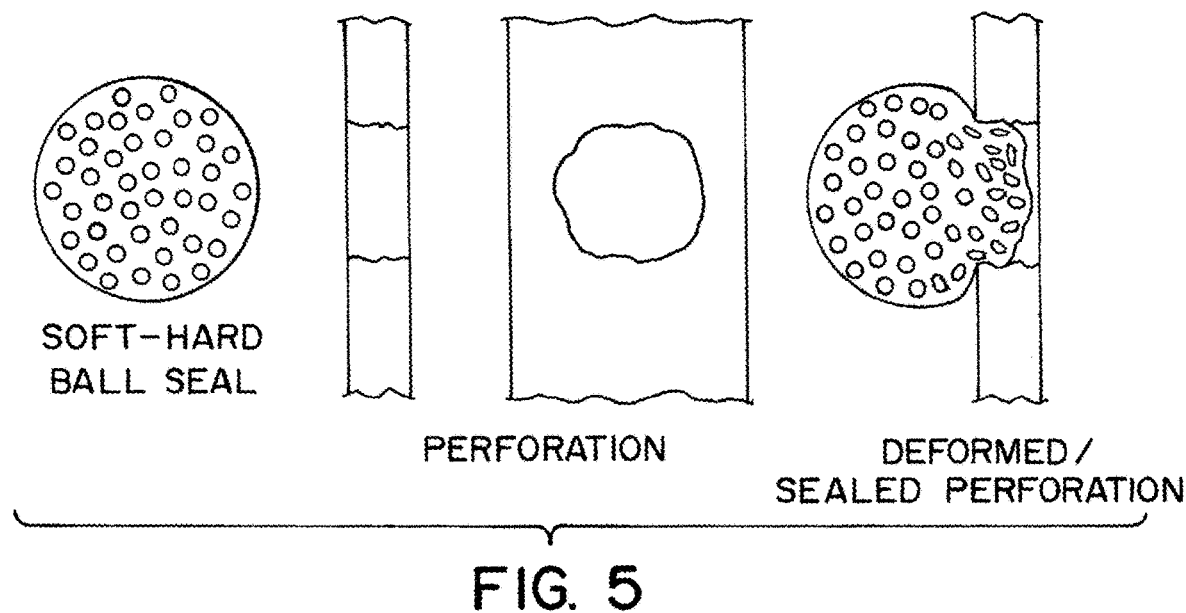
FIG. 5 illustrates a variable stiffness sealing ball or element encountering an opening in a well formation and deforming to form a seal in the opening.

Referring now to FIG. 1, there is illustrated the stress versus displacement for three different variable stiffness engineered degradable thermoplastic elastomers. As illustrated in FIG. 1, as load is applied to the variable stiffness engineered degradable thermoplastic elastomer ball or seal, significant deformation of the soft phase occurs in the variable stiffness engineered degradable thermoplastic elastomer ball or seal. After a certain point, the load in the variable stiffness engineered degradable thermoplastic elastomer ball or seal is transferred to the hard phase of the variable stiffness engineered degradable thermoplastic elastomer ball or seal, and the load increases at 5-100× (and all values and ranges therebetween) the slope of the soft phase. Deformations of the variable stiffness engineered degradable thermoplastic elastomer ball or seal of about 5-50% are common before shifting from the low to high stiffness (slope). The increase in stiffness and hardness of the variable stiffness engineered degradable thermoplastic elastomer results in less deformation of the variable stiffness engineered degradable thermoplastic elastomer. As such, after the variable stiffness engineered degradable thermoplastic elastomer has undergone some deformation to partially or fully conform to the shape about an opening in a well formation to form a seal in/about the opening, further deformation of the variable stiffness engineered degradable thermoplastic elastomer is reduced or terminated so the deformed variable stiffness engineered degradable thermoplastic elastomer is retained in its sealing position at/about the opening. As can be appreciated, if the stiffness of the variable stiffness engineered degradable thermoplastic elastomer does not increase, the variable stiffness engineered degradable thermoplastic elastomer would continue to deform and thereby be formed through the opening in the well formation and compromise the seal in the opening. The unique feature of the variable stiffness engineered degradable thermoplastic elastomer is its ability to deform to partially or fully conform to a shape of an opening in the well formation, thereby creating a seal in/about the opening, and thereafter resisting further deformation to maintain the deformed shape, thereby maintaining the seal in/about the opening. Generally, the variable stiffness engineered degradable thermoplastic elastomer is designed to deform about 10-75% (and all values and ranges therebetween). For example, a 3 in. diameter diverter ball formed of the variable stiffness engineered degradable thermoplastic elastomer could be caused to deform such that, if the diverter ball was flattened by a fluid pressure, the diameter of the diverter ball would decrease to about 2.7 in. (10% deformation) to 0.75 in. (75% deformation). As will be discussed in more detail with respect to FIG. 5, deformation of the variable stiffness engineered degradable thermoplastic elastomer does not need to be uniform throughout the variable stiffness engineered degradable thermoplastic elastomer when partially or fully sealing an opening. As illustrated in FIG. 5, only a portion of the spherical diverter ball has deformed, and wherein such deformation is at the location of the opening in the well formation. In the deformed region of the spherical diverter ball, the stiffening components have moved in close proximity to one another and/or are contacting one another, thereby resulting in increased stiffness and/or hardness in such deformed region, thus resisting further deformation in such region.

Figure 2:
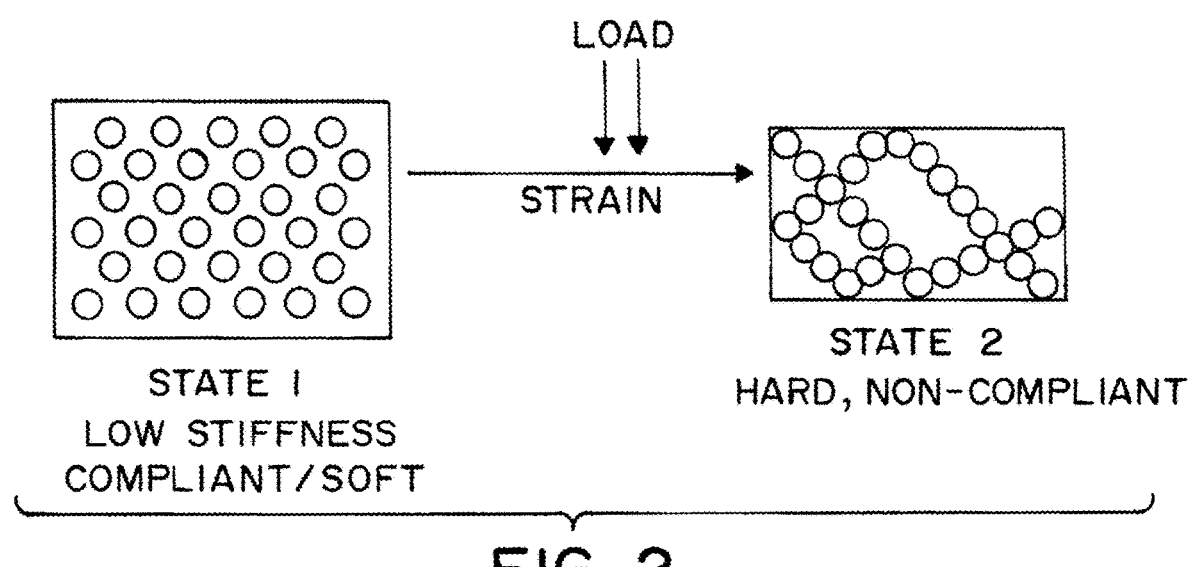
FIG. 2 illustrates a variable stiffness elastomeric composite consisting of hard spheres added at 30-70 vol. % to a dissolvable elastomer matrix.

FIG. 2 illustrates a variable stiffness elastomeric composite consisting of hard spheres added at 30-70 vol. % (and all values and ranges therebetween) to a dissolvable elastomer matrix. The hard spheres (e.g., microballoons, solid spheres, etc.) are illustrated as being generally uniformly dispersed in the dissolvable elastomer matrix prior to deformation of the variable stiffness elastomeric composite (State 1). In State 1, the variable stiffness elastomeric composite has a lower stiffness than in State 2. As a strain or load (indicated by the arrows) is applied to one or more regions of the variable stiffness elastomeric composite, the variable stiffness elastomeric composite is caused to be deformed when a sufficient strain or load is applied (State 2). The dissolvable elastomer matrix controls the stiffness of the variable stiffness elastomeric composite until the spheres begin to contact each other (e.g., dissolvable elastomer matrix is extruded from between the microballoons, bringing them into close or direct contact), at which point the stiffness of the variable stiffness elastomeric composite dramatically increases. In State 2, the hardness and stiffness of the variable stiffness elastomeric composite is greater than the hardness and stiffness of the variable stiffness elastomeric composite in State 1.

Figure 3:
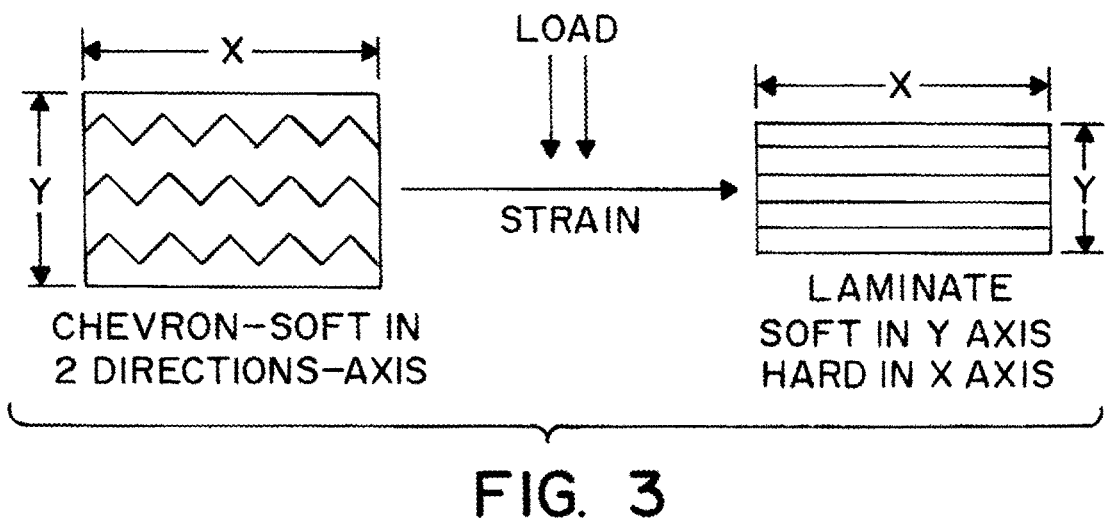
FIG. 3 illustrates a textured, directionally-compliant variable stiffness engineered degradable thermoplastic elastomer material that can be used to form a ball or seal.

FIG. 3 illustrates a textured, directionally-compliant variable stiffness elastomeric composite used to form a ball or seal. The crimped stiffness component (e.g., metal component, graphite component, plastic component, etc.) deforms with the dissolvable elastomer matrix until the stiffness component is straightened out or flattened, at which point the stiffness component becomes non-compliant (e.g., no long can be compressed) and the hardness and stiffness of the variable stiffness elastomeric composite dramatically increases. As illustrated in FIG. 3, the configuration of the stiffness component has a shape (e.g., repeating V-shape, sinusoidal shape, other non-straight shape, etc.) such that when a load or strain is applied to a top of the variable stiffness elastomeric composite, the stiffness component can no longer be compressed in the Y direction and can no long increase in length in the X direction, thus becomes rigid or stiff in the X direction, thereby inhibiting or preventing deformation of the variable stiffness elastomeric composite in the X direction. As can be appreciated, some further deformation of the variable stiffness elastomeric composite in the Y direction may occur due to the spacing of the stiffness components from one another in the Y direction. As such, in State 1 prior to deformation, the variable stiffness elastomeric composite can be deformed in the X and Y direction. After deformation in State 2, the variable stiffness elastomeric composite is stiff for further deformation in the X direction but is still able to further deform in the Y direction. As can be appreciated, the orientation of the stiffness component in the variable stiffness elastomeric composite can be selected such that stiffness occurs in a direction other than or in addition to the X direction when a load is applied to the variable stiffness elastomeric composite on the top and/or other outer surfaces of the variable stiffness elastomeric composite.

As can be appreciated, by combining the stiffness components illustrated in FIGS. 2 and 3 in the variable stiffness elastomeric composite, control over stiffness/compliance in both X and Y directions can be obtained. By controlling the straightness of the stiffness components, which can be continuous or discontinuous, the amount of strain in the X direction before the variable stiffness elastomeric composite becomes rigid can be controlled with a high degree of precision. Such variable stiffness elastomeric composites can be highly useful in seals and can be fabricated by laminating, compounding, or rolling (e.g., foil or ribbon winding) processes.

Figure 4:
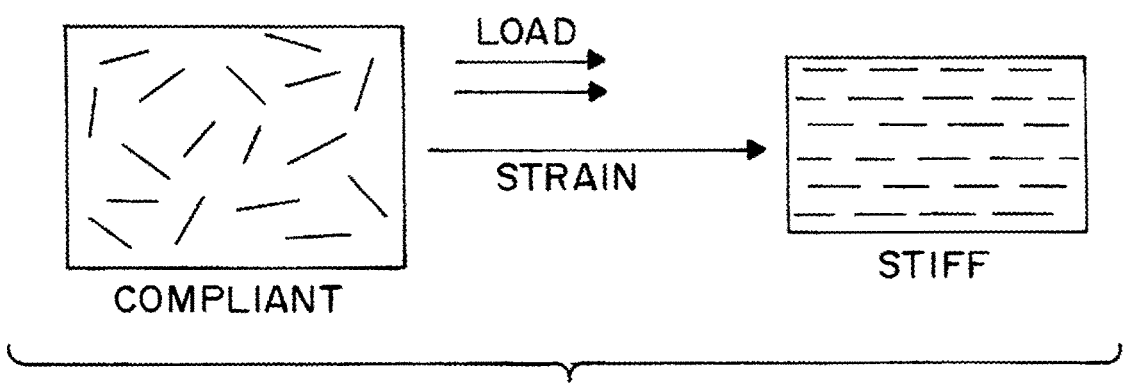
FIG. 4 illustrates a method of using flake or fiber that accomplishes a similar result as the approach illustrated in FIG. 3 in a pultruded or more easily moldable structure.

FIG. 4 illustrates a variable stiffness elastomeric composite including a plurality of flakes or fibers for the stiffness component that accomplishes a similar result described above with regard to the variable stiffness elastomeric composite illustrated in FIG. 3. The variable stiffness elastomeric composite illustrated in FIG. 4 is generally a more easily moldable structure than the variable stiffness elastomeric composite illustrated in FIG. 3 due to the configuration of the stiffness components. As illustrated in FIG. 4, as the flakes and/or fibers align in the variable stiffness elastomeric composite during deformation of the variable stiffness elastomeric composite in the X and/or Y direction, the flakes and/or fibers inhibit or prevent further deformation in a direction to the applied force on the variable stiffness elastomeric composite. As can be appreciated, the stiffness components illustrated in FIGS. 2 and/or 3 can be combined with the stiffness components illustrated in FIG. 4.

The techniques for creating increased stiffness and/or hardness of the variable stiffness elastomeric composite when the variable stiffness elastomeric composite is deformed are particularly effective in controlling extrusion or creep of a seal formed of the variable stiffness elastomeric composite under load.

A non-limiting application for use of the variable stiffness elastomeric composite to sealing an opening in a well formation is illustrated in FIG. 5. Generally, the shape of the opening in a well formation is not uniformly circular. In fact, the openings in a well formation are typically non-uniform in shape, thereby making it difficult to seal the non-uniform opening using traditionally shaped spherical diverter balls. As illustrated in FIG. 5, the spherically-shaped variable stiffness elastomeric composite or variable stiffness degradable deformable metallic material is caused to deform and readily conform to the irregular surface and/or shape of the opening to create a seal at/in the opening. As illustrated in FIG. 5, the portion of the variable stiffness elastomeric composite or variable stiffness degradable deformable metallic material that is deformed increases in stiffness and/or hardness and thereby resists further deformation once a portion of the variable stiffness elastomeric composite or variable stiffness degradable deformable metallic material deforms at/in the opening and forms a seal at/in the opening. As illustrated in FIG. 5, only the region of the variable stiffness elastomeric composite or variable stiffness degradable deformable metallic material located about the opening is illustrated as being deformed; however, it can be appreciated that other regions of the variable stiffness elastomeric composite or variable stiffness degradable deformable metallic material can be deformed. Due to the increased hardness and/or stiffness of the deformed variable stiffness elastomeric composite or variable stiffness degradable deformable metallic material, the variable stiffness elastomeric composite or variable stiffness degradable deformable metallic material resists being pushed through the opening as illustrated in FIG. 5.

As partially illustrated in FIG. 5, as the diverter ball or seal that is at least partially formed of a variable stiffness elastomeric composite or variable stiffness degradable deformable metallic material encounters the opening in the well formation (which can be non-circular or ragged), the variable stiffness elastomeric composite or variable stiffness degradable deformable metallic material deforms until a seal is made about/in the opening. Under continued applied pressure, the rigid or hard phase formed by the stiffening component begins to dominate in the variable stiffness elastomeric composite or variable stiffness degradable deformable metallic material after a controlled or certain amount of deformation of the variable stiffness elastomeric composite or variable stiffness degradable deformable metallic material. The deformed variable stiffness elastomeric composite or variable stiffness degradable deformable metallic material densifies, thereby becoming stiffer and/or stronger, and thus forms a high strength, rigid plug that seals the opening in the well formation, but which deformed variable stiffness elastomeric composite or variable stiffness degradable deformable metallic material resists further deformation to inhibit or prevent the deformed variable stiffness elastomeric composite or variable stiffness degradable deformable metallic material from being extruded or pushed through the hole in the well formation.

The deformable variable stiffness elastomeric composite or variable stiffness degradable deformable metallic material can also be fabricated in situ in the well formation. This can be accomplished by combining in the well formation the deformable and more stiffness components that are used to form the variable stiffness elastomeric composite or variable stiffness degradable deformable metallic material. The deformable and more stiffness components can be separately flowed into the well formation; however, this is not required. For example, a deformable variable stiffness elastomeric composite can be formed in situ in the well formation by flowing into the well formation a pill that is combination of metallic flakes or foil elastomeric material (e.g., powdered coating, etc.), whereby the pills are pressed together at or near an opening in the well formation to form a network of connected pills, thereby forming a deformable variable stiffness elastomeric composite that can be built up to form a seal in an opening in the well formation. The use of different cross-section stiffener components (e.g., X-shaped, hollow rods, syntactic metallic rods, etc.) combined with PVA or other plastic or elastic dissolvable material can be used to form a deformable variable stiffness elastomeric composite from this function in situ in the well formation for sealing an opening in the well formation.

Figure 6:
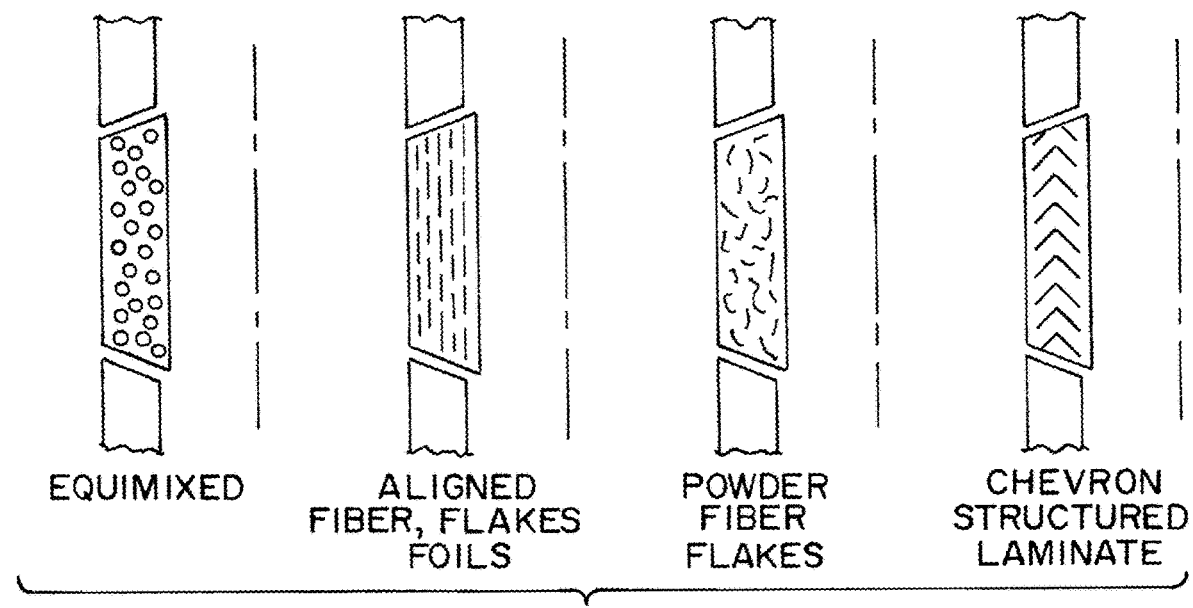
FIG. 6 illustrates the orientation and the type of rigid (hard) filler in used in the elastomer structured seal/packer control deformation and to inhibit or prevent extrusion and creep.

The variable stiffness elastomeric composite or variable stiffness degradable deformable metallic material can be used as a sealing element, O-ring, ring seal, packing element, or other type seal. FIG. 6 illustrates four (4) non-limiting useful variable stiffness elastomeric composites or variable stiffness degradable deformable metallic materials in a symmetric (only one-half shown) cross-section, and illustrate the stiffening component (e.g., rigid spheres, aligned flakes, fibers, or ribbons [oriented parallel to the compression orientation], random flakes or fibers, and/or chevron or structured stiff phase designs) in various configurations. These four non-limiting designs are particularly effective at preventing compression set, extrusion, and creep, particularly at elevated temperatures and pressures.

Another non-limiting design includes the use of metal encapsulation of all or part of the degradable elastomer (e.g., elastomer-filled degradable metal tube or shape/extrusion), wound or laminated structure, or stacked ring or cone structure to prevent extrusion and enable higher pressure ratings to be met.

Figure 7:
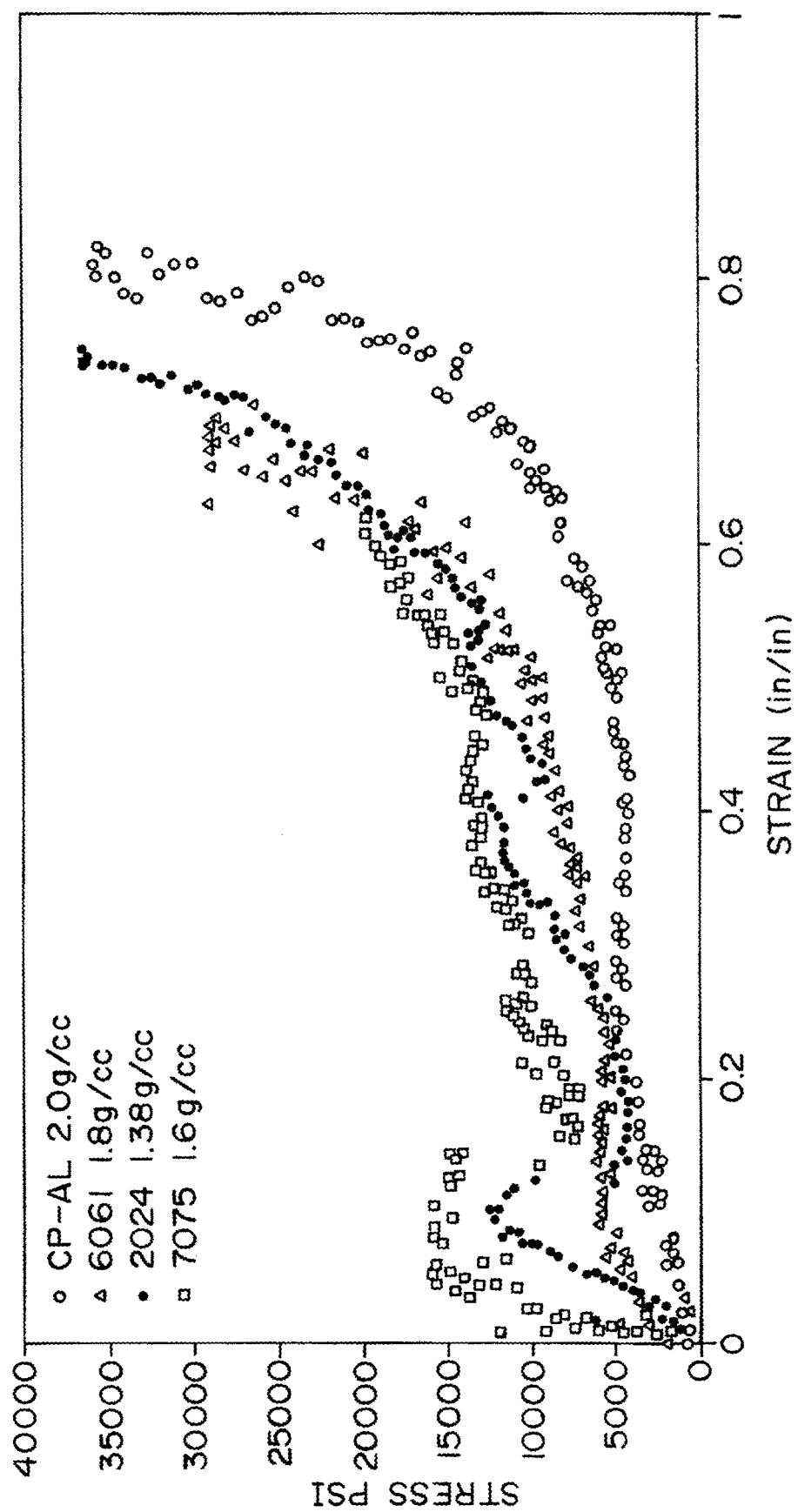
FIG. 7 illustrates the compressive strength as a function of strain for syntactic aluminum alloys that can be dissolved using an acid or gelbreaker or, alternatively, a hot caustic solution.

FIG. 7 illustrates the compressive strength as a function of strain for syntactic aluminum alloys that can be dissolved using an acid or a gelbreaker or, alternatively, a hot caustic solution. Initial crush strengths of 5,000-10,000 psi (and all values and ranges therebetween) are typical for 40 vol. % microballoon-reinforced alloys. Initial crush strength can be controlled by alloy and heat treatment selection, as well as microballoon size, strength (e.g., wall thickness), and content. Generally, microballoon content of the variable stiffness degradable deformable metallic material is 10-60 vol. % (and all values and ranges therebetween), and typically 30-50 vol. %. The microballoons generally have crush strengths of 1000-8,000 psig (and all values and ranges therebetween), and typically microballoons have crush strengths of 1500-6000 psig crush strength can be used. Degradable aluminum alloys, zinc alloys, and magnesium alloys, as well as degradable polymers (elastomers, PVA, PLA and PGA and their mixtures, PEG, cellulistic polymers, nylon (particularly with CaO, $Na_2O$, $BaSO_4$, $NH_3SO_4$ or other high or low PH creating addition on contact with water) are particularly useful in creating a degradable variable stiffness elastomeric composite or variable stiffness degradable deformable metallic material.

As illustrated in FIG. 7, after local deformation of the variable stiffness degradable deformable metallic material formed of a degradable aluminum alloy having microballoons dispersed in the degradable aluminum alloy, the strength (and stiffness) increases dramatically, thereby inhibiting or preventing further deformation without the addition of much higher forces. This increase in strength and/or stiffness is the result of the crushing of the microballoons, the resulting reduction of porosity, and density increase of the variable stiffness degradable deformable metallic material. In this manner, the variable stiffness degradable deformable metallic material can "seat-in" to complex cavities and then resist further deformation, becoming a solid plug or seal with reduced leakage. Proper design of a sealing surface can be envisioned by one skilled in the art. The density of a variable stiffness degradable deformable metallic material in the form of a divertor (e.g., [glass, ceramic, and/or carbon microballoon]-magnesium diverter or [glass, ceramic, and/or carbon microballoon]-magnesium frac ball) can be 0.95-1.4 g/cc. As can be appreciated, a divertor or frac ball formed of variable stiffness elastomeric composite can also have similar densities. In addition or alternatively, the diverter or frac ball can include a central cavity constituting no more than 70 vol. % of the diverter or frac ball, and typically about 20-50 vol % of the diverter or frac ball, and more typically 30-50 vol % of the diverter or frac ball to control the density to 1.02-1.15 g/cc to match the density of the completion fluid or brine. The size of the central cavity and/or volume percent of the microballoons in the diverter or frac ball can be selected such that the density of the diverter or frac ball is the same or similar to the sand or proppant-water mixture density used in the completion process, such that flow of the diverter or frac balls matches the flow of the completion fluid.

To facilitate understanding of several non-limiting aspects of the disclosure, the following non-limiting examples are provided.

For loss control applications, a larger flexible sheet or foil can be used. Typical loss control materials include rags, etc., which are often tied into a knot and added. A good shape for the variable stiffness elastomeric composite or variable stiffness degradable deformable metallic material to form seals while being pumpable is a V or conical shape, with or without tails, that follow fluid flow but seat and are retained in a fracture.

Example 1

An elastomeric dissolvable composite ball formed of about 50 vol. % soda lime glass microballoons having a particle size of 30 μm and a density of 0.23 g/cc was bonded together with 20 vol. % powdered nitrile-butadiene rubber (NBR) particles and 30 vol. % polyvinyl alcohol. The elastomeric dissolvable composite ball had a size of ⅞ in. diameter and an overall density of 0.95 g/cc. The elastomeric dissolvable composite ball was tested to hold 1500 psi for two hours and, as illustrated in Table 1, loses 50% weight over a period of 72 hours in tap water at 51.7° C., and which left particles in the range of 30-100 μm.

Example 2

An elastomeric dissolvable composite ball formed of about 60 vol. % soda lime glass microballoons having a particle size of 30 micron and a density of 0.23 g/cc was bonded together with 20 vol. % powdered NBR particles and 20 vol. % polyvinyl alcohol. The elastomeric dissolvable composite ball had a size of ⅞ in. diameter and an overall density of 0.80 g/cc. The elastomeric composite ball was tested to hold 1500 psi for four hours and, as illustrated in Table 1, loses 50% weight over a period of 96 hours in tap water at 51.7° C., and which left particles in the range of 30-100 μm.

TABLE 1

| Example | Initial Wt. (g) | 3 hrs. (g) | 6 hrs. (g) | 24 hrs. (g) | 48 hrs. (g) | 72 hrs. (g) |
|---|---|---|---|---|---|---|
| 1 | 5.583 | 5.790 | 5.340 | 4.956 | 4.709 | 2.970 |
| 2 | 5.712 | 5.986 | 6.150 | 5.541 | 4.616 | 2.907 |

Example 3

Figure 8:
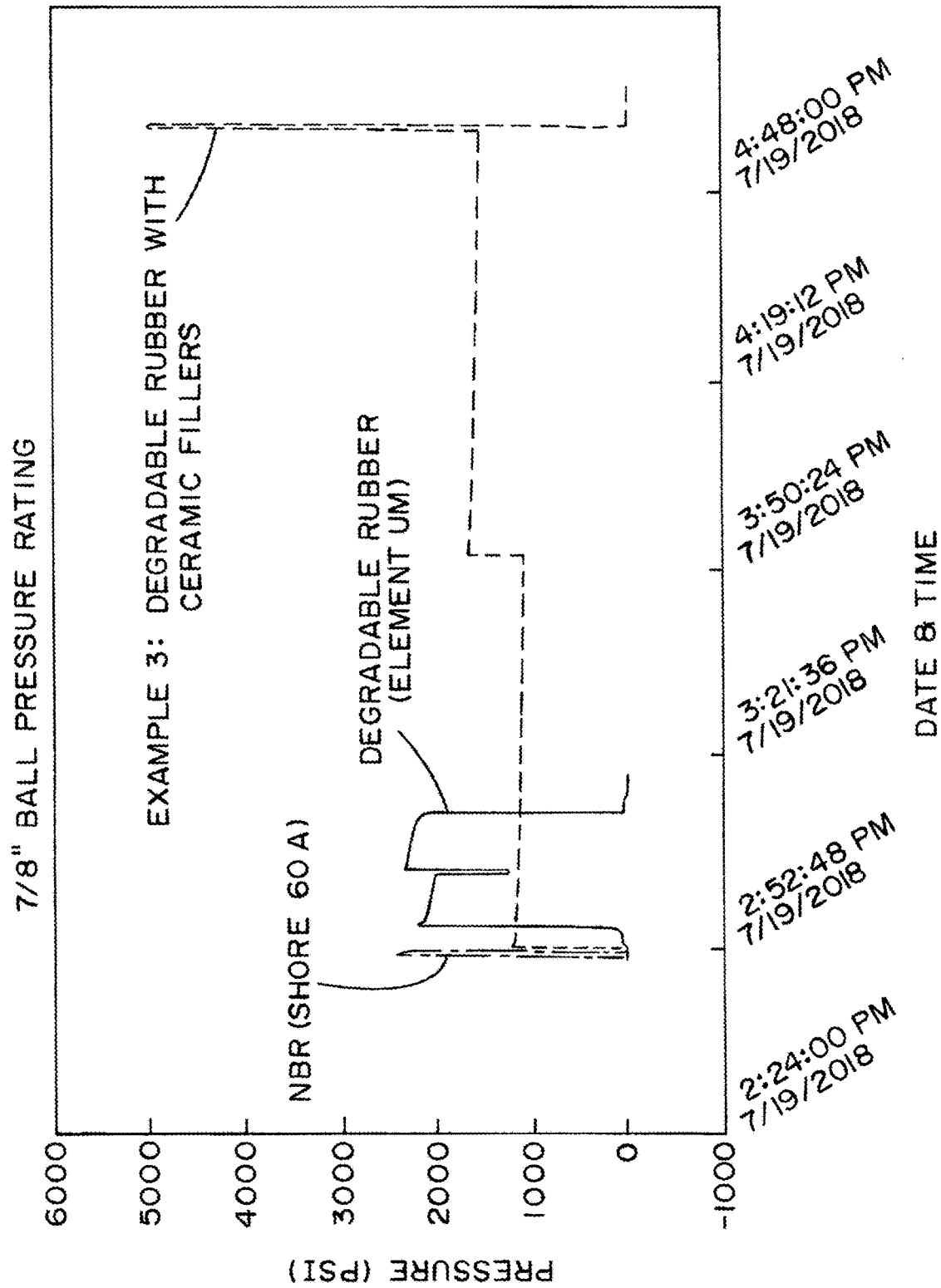
FIG. 8 is a graph illustrating the pressure ratings of various elastomeric composite balls over time.
Figure 9:
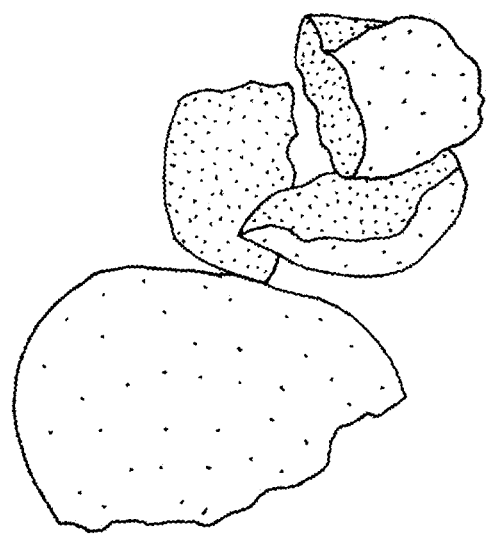
FIG. 9 illustrates a partially degraded elastomeric composite ball.

An elastomeric dissolvable composite ball formed of about 60 vol. % soda lime glass microballoons having a particle size of 20 μm and a density of 0.46 g/cc was bonded together with 20 vol. % powdered NBR particles and 20 vol. % polyvinyl alcohol. The elastomeric dissolvable composite ball had a size of ⅞ in. diameter and an overall density of 1.05 g/cc. This elastomeric composite ball was tested to hold 1500 psi for 0.5 hours, as illustrated in FIG. 8, and loses 50% weight over a period of 24 hours in tap water at 51.7° C., and which left particles in the range of 50-70 μm. The partially degraded ball is illustrated in FIG. 9.

Example 4

A degradable magnesium alloy is used as a binder with 40 vol. % hollow ceramic microballoons (fillite 150 cenospheres), having an initial crush strength of 3500 psig and a density of 1.35 g/cc via squeeze casting into a microballoon-magnesium powder preform at 500 psig. The microballoon-magnesium powder was then extruded to form rods. Thereafter, the extruded rods were machined into balls.

Suitable degradable cast magnesium composites that can be used include degradable cast magnesium composites disclosed in U.S. Pat. Nos. 9,757,796; 9,903,010; 10,329,653 and U.S. Pub. No. 2019/0054523, which are incorporated herein by reference. The dissolvable cast magnesium composite generally includes greater than 50 wt. % magnesium and about 0.5-49.5 wt. % of additive (e.g., aluminum, zinc, tin, beryllium, boron carbide, copper, nickel, bismuth, cobalt, titanium, manganese, potassium, sodium, antimony, indium, strontium, barium, silicon, lithium, silver, gold, cesium, gallium, calcium, iron, lead, mercury, arsenic, rare earth metals [e.g., yttrium, lanthanum, samarium, europium, gadolinium, terbium, dysprosium, holmium, ytterbium, etc.], and zirconium). Generally, the dissolvable cast magnesium composite has a magnesium content of at least 85 wt. %. In one non-limiting embodiment, a magnesium composite that is over 50 wt. % magnesium and about 0.05-49.5 wt. % nickel (and all values or ranges therebetween) is added to the magnesium or magnesium alloy to form intermetallic magnesium-nickel as a galvanically-active in situ precipitate (e.g., 0.05-23.5 wt. % nickel, 0.01-5 wt. % nickel, 3-7 wt. % nickel, 7-10 wt. % nickel, or 10-24.5 wt. % nickel). In another non-limiting embodiment, a magnesium composite that is over 50 wt. % magnesium and about 0.05-49.5 wt. % copper (and all values or ranges therebetween) is added to the magnesium or magnesium alloy to form intermetallic magnesium-copper as a galvanically-active in situ precipitate (e.g., 0.01-5 wt. % copper, 0.5-15 wt. % copper, 15-35 wt. % copper, 0.01-20 wt. % copper). In another non-limiting embodiment, there is provided a magnesium composite that is over 50 wt. % magnesium and about 0.05-49.5 wt. % of an additive (and all values or ranges therebetween) (e.g., calcium, copper, nickel, cobalt, bismuth, silver, gold, lead, tin, antimony, indium, arsenic, mercury, gallium, and rare earth metals). The degradable cast magnesium composite generally has a dissolution rate of at least 5 $mg/cm^2$-hr. in 3 wt. % KCl at 90° C. (e.g., 40-325 $mg/cm^2$/hr. in 3 wt. % KCl water mixture at 90° C., 50-325 $mg/cm^2$/hr. in 3 wt. % KCl water mixture at 90° C.; 75-325 $mg/cm^2$/hr. in 3 wt. % KCl water mixture at 90° C.; 84-325 $mg/cm^2$/hr. in 3 wt. % KCl water mixture at 90° C.; 100-325 $mg/cm^2$/hr. in 3 wt. % KCl water mixture at 90° C.; 110-325 $mg/cm^2$/hr. in 3 wt. % KCl water mixture at 90° C.). The degradable cast magnesium composites generally have a dissolution rate of up to 1 $mg/cm^2$/hr. in 3 wt. % KCl water mixture at 20° C. The degradable cast magnesium composites generally include no more than 10 wt. % aluminum.

Suitable degradable powdered metallurgy magnesium composites formed from compression and/or sintering include the degradable magnesium composites disclosed in U.S. Pub. No. 2007/0181224 and U.S. Pat. No. 8,663,401, which are incorporated herein by reference. For example, the degradable powdered metallurgy magnesium composites can include one or more reactive metals selected from calcium, magnesium, and aluminum, and one or more secondary metals such as lithium, gallium, indium, zinc, bismuth, calcium, magnesium, tin, copper, silver, cadmium, and lead.

A plurality of 3.4 in. diverter balls was inserted into a flowing completion fluid containing sand and allowed to reach the completion zone. The near neutral buoyancy of the diverter balls followed the main flow of the completion fluid and then seated into the opening in the well formation. The diverter balls locally crush at the edges to partially conform to the eroded hole geometry in the well formation and divert 80-95 vol. % of the flow of the completion fluid to other openings in the well formation. By periodically inserting additional diverter balls in the completion fluid, a dramatic increase in fracture uniformity and sand placement was achieved in the well formation. After stimulation of the well formation was completed, a gelbreaker, buffered pH addition (e.g., monosodium sulfate, etc.), etc., was added to the completion fluid, which resulted in the complete solubilization of the magnesium of the diverter balls to produce a clear solution that did not degrade the formation geology. In one non-limiting embodiment, a delay release gelbreaker (e.g., encapsulated acid, encapsulated xylanase/hemicellulase complex, encapsulated ammonium persulfate, encapsulated potassium persulfate, encapsulated sodium persulfate, encapsulated sodium bromate, etc.) can be used to remove the seals after an engineered time by controlling fluid conditions.

After performing their function, the magnesium-based diverters are removed by further exposure to a completion fluid or breaker, which can include fresh, brackish water, or saline solutions, or with breaker fluids, such as those with a reduced or buffered pH that is generally less than about 7, and typically below 5.5-6 pH, and more typically less than about 4 pH. The magnesium alloy and degradation characteristics can be, and usually are, matched to the fluid and wellbore temperature conditions.

Example 5

A degradable magnesium alloy is formed into a ¾ in. hollow ball fabricated to have near neutral buoyancy in drilling mud. The ball is coated with a degradable plastic or elastomeric coating having a thickness of about 0.1 in. The resultant ball is added to mud and circulated into a formation, where it becomes lodged in a fracture. Additional degradable diverter material can be added in the form of magnesium metal turnings and degradable elastomer or polymeric powders. Additional balls and sealant materials can be added and combined to seal multiple fractures or open areas to reduce pumping losses by at least 75%. After completion of drilling activities, an active agent including a pH-lowering gelbreaker (e.g., 5 vol. % HCl or green acid solution, etc.) is added in an encapsulated or unencapsulated form to the completion fluid and circulated through the wellbore formation. The interaction of the active fluid solubilizes the degradable component to create a clean/clear fluid with reduced impact on geologic formation properties.

Referring now to FIGS. 10-14, there is illustrated various non-limiting structures that can be formed on a variable stiffness engineered degradable thermoplastic elastomer ball or seal or degradable metallic composite ball or seal.

FIG. 10 illustrates six (6) different non-limiting flaps and provides three views for each flap, namely a cross-sectional view, a top view, and a side view. FIGS. 10A and 10D illustrate a disc-shaped flap located about the mid-region of the ball. The thickness of the flap tapers from the outer side of the ball to the edge of the flap. The width of the flap is illustrated as less than 50% the diameter of the ball. FIG. 10B illustrates a flap that includes a band section about the mid-region of the ball and a flange portion extending perpendicularly from the band section. The thickness of the flange portion is illustrated as less than the band section and the thickness of flange portion is illustrated as constant along the longitudinal length of the flange portion. The width of the flap is illustrated as less than 50% the diameter of the ball. FIG. 10C illustrates a flap located at the mid-region of the ball and which has a wavy cross-sectional shape. The width of the flap is illustrated as less than 50% the diameter of the ball. FIG. 10E illustrates a flap located at the mid region of the ball and which angles downwardly from the ball. The thickness of the flap tapers from the outer side of the ball to the edge of the flap. The width of the flap is illustrated as greater than 50% the diameter of the ball. FIG. 10F illustrates a flap similar to the flap illustrated in FIG. 10E except that the flap is connected to the top region of the ball.

FIG. 11 illustrates variable stiffness engineered degradable thermoplastic elastomer ball or seal or degradable metallic composite ball or seal having four (4) different non-limiting tail designs, namely a cross-sectional view, a top view, and a side view. FIG. 11A illustrates a ball wherein a tail structure is connected to the bottom of the ball. The thickness of the tail structure is illustrated as constant along the longitudinal length of the tail structure and is less than 50% the diameter of the ball. The longitudinal length of the tail structure is illustrated as greater than 50% the diameter of the ball. The tail structure has a linear profile along the longitudinal length of the tail structure. FIGS. 11B and 11D illustrate a cone-shaped tail structure connected to the bottom of the ball. FIG. 11B illustrates a circular cross-sectional ball and FIG. 11D illustrates an oval cross-sectional ball. The thickness of the tail structure is illustrated as variable along the longitudinal length of the tail structure and is greater than 50% the diameter of the ball as illustrated in FIG. 11B and about 30-70% the diameter of the ball as illustrated in FIG. 11D. The longitudinal length of the tail structure illustrated in FIG. 11B is greater than 50% the diameter of the ball and the longitudinal length of the tail structure illustrated in FIG. 11D is about 30-70% the diameter of the ball as illustrated in FIG. 11D. FIG. 11C illustrates a ball wherein the tail structure is connected to the bottom of the ball. The thickness of the tail structure is illustrated as constant along the longitudinal length of the tail structure and is less than 50% the diameter of the ball. The longitudinal length of the tail structure is illustrated as greater than 50% the diameter of the ball. The tail structure has a wavy profile along the longitudinal length of the tail structure.

FIG. 13 illustrates a variable stiffness engineered degradable thermoplastic elastomer ball or seal or degradable metallic composite ball or seal having two (2) different non-limiting flap designs, namely a cross-sectional view, a top view, and a side view. FIG. 12A illustrates a flap design similar to FIGS. 10E and 10F except that the flap is connected at or near the bottom region of the ball. FIG. 13B illustrates a flap that has a "dog eared" shape. The flap is connected at or near the top region of the ball and extends downwardly below the bottom the ball. The thickness of the flap varies along the longitudinal length of the ball. The longitudinal length of the ball is greater than 75% the diameter of the ball.

FIG. 14 illustrates a variable stiffness engineered degradable thermoplastic elastomer ball or seal or degradable metallic composite ball or seal having five (5) different non-limiting flap designs formed on a ball with a cavity, namely a cross-sectional view, a top view, and a side view. Each of the balls is illustrated as being hollow. FIG. 14A illustrates a flap configuration similar to FIG. 10A. FIG. 14B illustrates a flap configuration similar to FIG. 10E. FIG. 14C illustrates a flap configuration similar to FIG. 10E. FIG. 14D illustrates a flap configuration similar to FIG. 13A. FIG. 14E illustrates a flap configuration similar to FIG. 13B.

FIG. 12 illustrates a variable stiffness engineered degradable thermoplastic elastomer ball or seal or degradable metallic composite ball or seal having four (4) different non-limiting flap and tail designs, namely a cross-sectional view, a top view, and a side view. FIG. 12A has a flap configuration similar to FIG. 10A and a tail structure similar to FIG. 11D. FIG. 12B has a flap configuration similar to FIG. 10F and a tail structure similar to FIG. 11D. FIG. 12C has a flap configuration similar to FIG. 10F and a tail structure similar to FIG. 11C. FIG. 12D has a flap configuration similar to FIG. 10D and a tail structure similar to FIG. 11D.

As can be appreciated, the variable stiffness engineered degradable thermoplastic elastomer ball or seal or degradable metallic composite ball or seal can have any combination of the flap and tail configurations of FIGS. 10-14.

Example 6

A flap formed of a rubber component was made (as illustrated in the second configuration of FIG. 12) out of a degradable rubber. The engineered degradable device has a density of about 1.1 g/cc. The engineered degradable device achieved neutral buoyancy in a saltwater solution. While under flow in a clear flow loop, the engineered degradable device was seen to align with the flow of water. A group of engineered degradable devices were added to a test setup with irregular holes approximately ½ in. in diameter. The engineered degradable device in the flow plugged the holes by settling into the holes. The flaps of the engineered degradable device started filling the irregularities of the holes after a pressure increase of between 1 and 2 ksi. When the irregularities were plugged with the engineered degradable device, the pressure raised to about 6 ksi and was held. The same engineered degradable device in a different test in di water at 60° C. degraded over five days into a flowable gel.

Example 7

A NBR rubber component was made as per the fourth configuration of FIG. 13. While under flow in a clear flow loop, the component was seen to align with the flow of water. A group of components were added to a test setup with irregular holes approximately ½ in. in diameter. The components in the flow plugged the holes by settling into the holes. The flaps of the components started filling the irregularities of the holes after a pressure increase of between 1 and 2 ksi. When the irregularities were plugged with the component, the pressure raised up to about 8 ksi and was held.

Example 8

A NBR rubber component was made as per the first configuration of FIG. 10. While under flow in a clear flow loop, the component was seen to tumble randomly in the flow of water. A group of components were added to a test setup with irregular holes approximately ½ in. in diameter. The components in the flow plugged the holes by settling into the holes. The flaps of the components started filling the irregularities of the holes after a pressure increase of between 500 and 800 psi. When the irregularities were plugged with the component, the pressure raised up to about 3000 psi and was held. A comparison of a ⅞ in. ball of the same material was tested and the same setup only pressurized to 800 psi with significant leaks from the irregular holes.

Example 9

A degradable rubber component flap was overmolded onto a dissolvable hollow metal core made as per the third configuration of FIG. 14. The degradable rubber has a density of about 1.2 g/cc. The component achieved neutral buoyancy in a saltwater solution. While the component flows in a clear flow loop, the component was seen to align with the flow of water. A group of components were added to a test setup with irregular holes approximately ½ in. in diameter. The components in the flow plugged the holes by settling into the holes. The flaps of the components started filling the irregularities of the holes after a pressure increase of between 1 and 2 ksi. When the irregularities were plugged with the component, the pressure raised up to about 9 ksi and was held. The same component in a different test in 0.1% KCl water at 60° C. degraded over five days into powder and a flowable gel.

It will thus be seen that the objects set forth above, among those made apparent from the preceding description, are efficiently attained, and since certain changes may be made in the constructions set forth without departing from the spirit and scope of the disclosure, it is intended that all matter contained in the above description and shown in the accompanying drawings shall be interpreted as illustrative and not in a limiting sense. The disclosure has been described with reference to preferred and alternate embodiments. Modifications and alterations will become apparent to those skilled in the art upon reading and understanding the detailed discussion of the disclosure provided herein. This disclosure is intended to include all such modifications and alterations insofar as they come within the scope of the present disclosure. It is also to be understood that the following claims are intended to cover all of the generic and specific features of the disclosure herein described and all statements of the scope of the disclosure, which, as a matter of language, might be said to fall there between. The disclosure has been described with reference to the preferred embodiments. These and other modifications of the preferred embodiments as well as other embodiments of the disclosure will be obvious from the disclosure herein, whereby the foregoing descriptive matter is to be interpreted merely as illustrative of the disclosure and not as a limitation. It is intended to include all such modifications and alterations insofar as they come within the scope of the appended claims.

What is claimed:

1. A method of forming a temporary seal in a well formation that includes:
   a. providing a plurality of degradable components capable of forming a fluid seal; each of said degradable components includes a core structure and an extension structure; said extension structure is secured to a portion of an outer surface of said core structure; said extension structure extends outwardly from said outer surface of said core structure; said core structure is formed of a rubber material and less than 50 wt. % filler; said rubber material includes one or more rubbers selected from the group consisting of silicone rubber, urethane rubber, nitrile rubber, and fluoropolymer rubbers; said filler includes one or more materials selected from the group consisting of natural organic materials, inorganic minerals, silica materials and powders, ceramic materials, metallic materials and powders, synthetic organic materials and powders, mixtures, sodium chloride, sugar, silica flour calcium carbonate fillers, and/or fumed silica; said filler has a different composition from said rubber material; said core structure has a shape selected from the group consisting of a sphere, ellipsoid, cone, cube, a three dimensional shape that is equiaxed, and a three dimensional shape having an aspect ratio of 1-8; said extension structure that includes one or more structures selected from the group consisting of a flap and a tail; said extension structure is deformable and includes a material selected from the group consisting of a degradable polymer, a degradable elastomer, a degradable rubber, and a degradable metal; said core structure includes a material selected from the group consisting of a degradable polymer, a degradable elastomer, a degradable rubber, and a degradable metal; said degradable components includes said flap; said flap has a width that is less than 50% a diameter of said core structure; said flap is a) a disc-shaped flap and is located about a mid-region of said outer surface of said core structure; said disc-shaped flap tapers from said outer surface of said core structure to an outer edge of said disc-shaped flap, b) a band-shaped flap that is positioned about said mid-region of said outer surface of said core structure; said band-shaped flange a band body and a flange portion that extends perpendicularly from an outer surface of said the band body; a thickness of said flange portion is less than a thickness of said band body; said thickness of flange portion is constant along the longitudinal length of said flange portion, or c) a wavy-shaped flap that is positioned about said mid-region of said outer surface of said core structure;

b. combining said plurality of degradable components with a fluid to be inserted into said well formation;

c. inserting said fluid that includes said plurality of degradable components into said well formation to cause said plurality of degradable components to be positioned at or at least partially in an opening located in said well formation;

d. at least partially sealing said opening by deformation and agglomeration together of said plurality of degradable components that are located at or at least partially in said opening to thereby partially or fully block or divert a flow of said fluid into and/or through said opening; said deformation and agglomeration of said plurality of degradable components is at least partially caused by fluid pressure of said fluid at said opening that acts on said plurality of degradable components that are located in at said opening in said well formation;

e. performing operations such as drilling, circulating, pumping, and/or hydraulic fracturing in said well formation for a period of time after said plurality of degradable components have deformed in said opening and have at least partially sealed said opening; and, f. causing at least a portion of said plurality of degradable components to degrade and be partially or fully removed from said opening to thereby allow 80-100% of fluid flow rates into said opening that existed prior to said plurality of degradable components partially or fully sealing said opening.

2. The method as defined in claim 1, further including the step of causing a plurality of said degradable components to agglomerate with one another at and/or at least partially in said seal opening during said step of at least partially sealing; said plurality of said degradable components caused to at least partially agglomerated together by said fluid pressure of said fluid at said opening.

3. The method as defined in claim 2, wherein said degradable components includes said extension member; said extension member includes said tail; said tail is a) a bar-shaped tail connected to a bottom portion of said outer surface of said core structure; said bar-shaped tail having a straight shape along a longitudinal length of said bar-shaped tail and a constant width along said longitudinal length of said bar-shaped tail; a longitudinal length of said bar-shaped tail is greater than 50% a diameter of said core structure; said width of said bar-shaped tail is less than 50% said diameter of said core structure, b) a cone-shaped tail structure connected to a bottom portion of said outer surface of said core structure; a thickness of said cone-shaped tail is variable along a longitudinal length of said cone-shaped tail; a maximum which of said cone-shaped tail structure is greater than 30% said diameter of said core structure; a longitudinal length of said cone-shaped tail is at least 30% said diameter of said core structure, or c) a wavy-shaped tail connected to a bottom portion of said outer surface of said core structure; said wavy-shaped tail has a constant width along said longitudinal length of said wavy-shaped tail; a longitudinal length of said wavy-shaped tail is greater than 50% a diameter of said core structure; said width of said wavy-shaped tail is less than 50% said diameter of said core structure.

4. The method as defined in claim 1, wherein said degradable components includes said extension member; said extension member includes said tail; said tail is a) a bar-shaped tail connected to a bottom portion of said outer surface of said core structure; said bar-shaped tail having a straight shape along a longitudinal length of said bar-shaped tail and a constant width along said longitudinal length of said bar-shaped tail; a longitudinal length of said bar-shaped tail is greater than 50% a diameter of said core structure; said width of said bar-shaped tail is less than 50% said diameter of said core structure, b) a cone-shaped tail structure connected to a bottom portion of said outer surface of said core structure; a thickness of said cone-shaped tail is variable along a longitudinal length of said cone-shaped tail; a maximum which of said cone-shaped tail structure is greater than 30% said diameter of said core structure; a longitudinal length of said cone-shaped tail is at least 30% said diameter of said core structure, or c) a wavy-shaped tail connected to a bottom portion of said outer surface of said core structure; said wavy-shaped tail has a constant width along said longitudinal length of said wavy-shaped tail; a longitudinal length of said wavy-shaped tail is greater than 50% a diameter of said core structure; said width of said wavy-shaped tail is less than 50% said diameter of said core structure.

5. The method as defined in claim 1, wherein said core structure is formed of the same material as said extension structure.

6. The method as defined in claim 1, wherein said core structure is formed of a different material from said extension structure.

7. The method as defined in claim 1, wherein said plurality of degradable component each have has a size and shape that inhibits or prevents said degradable component from fully passing through said opening to be sealed.

8. The method as defined in claim 1, wherein said step of causing at least a portion of said plurality of degradable components to degrade and be partially or fully removed from said opening is at least partially accomplished by changing a composition of said fluid in contact with said degradable components.

9. The method as defined in claim 1, wherein said plurality of degradable components include first and second degradable components; an average size of said second degradable component is 10-90% smaller than an average size of said first degradable component.

10. The method as defined in claim 1, wherein said degradable component is a degradable elastomer or polymer and 10-80 vol. % of a stiffness component.

11. The method as defined in claim 10, wherein said degradable component is formed of said degradable elastomer or polymer and said stiffness component; said degradable elastomer or polymer forming a continuous phase in said degradable component; said degradable elastomer or polymer having a 50-100 shore A hardness and a strain to failure in tension or compression of at least 20%; said stiffness component forming a discontinuous second phase in said degradable component; said stiffness component includes one or more of a flake, fiber, foil, microballoon, ribbon, or sphere; said stiffness component having a different composition from said degradable elastomer or polymer; said stiffness component i) has a stiffness or hardness of at least five times a stiffness or hardness of said degradable elastomer or polymer and/or ii) allows for deformation of said degradable component when said degradable component is exposed to a force that is 10-75% of a strength of said degradable component prior to being deformed; a stiffness or yield strength of said degradable component changes when said degradable component deforms.

12. The method as defined in claim 11, wherein said degradable elastomer or polymer includes one or more of natural rubber, vulcanized rubber, silicone, polyurethane, synthetic rubber, polybutadienece, nitrile rubber (NBR), polyisobutylene, acrylater-butadinene rubber and styrene butadine rubber.

13. The method as defined in claim 10, wherein said stiffness component is aligned perpendicular to a primary direction of strain of said degradable component.

14. The method as defined in claim 10, wherein said stiffness component is aligned parallel to a principle direction of strain of said degradable component.

15. The method as defined in claim 10, wherein a composition of said stiffness component includes is selected from the group consisting of calcium carbonate, titanium dioxide, silica, talc, mica, sand, gravel, crushed rock, bauxite, granite, limestone, sandstone, glass, aerogels, xerogels, clay, alumina, kaolin, ceramic, gypsum dihydrate, insoluble salts, magnesium carbonate, calcium hydroxide, calcium aluminate, and magnesium carbonate.

16. The method as defined in claim 1, wherein said core structure of said degradable component is in the form of a sphere having a diameter of 0.3-1.5 in.

\* \* \* \* \*